United States Patent
Edge

(10) Patent No.: US 12,490,057 B2
(45) Date of Patent: Dec. 2, 2025

(54) SYSTEMS AND METHODS FOR PERIODIC AND TRIGGERED EVENT REPORTING VIA USER PLANE

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 18/311,877

(22) Filed: May 3, 2023

(65) Prior Publication Data

US 2023/0362592 A1 Nov. 9, 2023

Related U.S. Application Data

(60) Provisional application No. 63/382,207, filed on Nov. 3, 2022, provisional application No. 63/338,877, filed on May 5, 2022.

(51) Int. Cl.
*H04W 4/029* (2018.01)
*H04W 76/15* (2018.01)

(52) U.S. Cl.
CPC ........... *H04W 4/029* (2018.02); *H04W 76/15* (2018.02)

(58) Field of Classification Search
None
See application file for complete search history.

(56) References Cited

U.S. PATENT DOCUMENTS 8,000,702 B2   8/2011   Dawson et al.
8,867,556 B2  10/2014   Kim
(Continued)

FOREIGN PATENT DOCUMENTS

CN   101940041 A   1/2011
CN   102725649 A  10/2012
(Continued)

OTHER PUBLICATIONS

3GPP TR 23.700-71: "3rd Generation Partnership Project, Technical Specification Group Services and System Aspects, Study on Enhancement to the 5GC LoCation Services (LCS), Phase 3 (Release 18)", 3GPP TR 23.700-71, V0.3.0, 3rd Generation Partnership Project (3GPP), Mobile Competence Centre, 650, Route Des Lucioles, F-06921, Sophia-Antipolis Cedex, France, May 26, 2022, pp. 1-95, XP052159043, pp. 73-80.

(Continued)

*Primary Examiner* — German Viana Di Prisco
(74) *Attorney, Agent, or Firm* — QUALCOMM Incorporated

(57) ABSTRACT

Methods and apparatus are described for reducing end-to-end latency for location determination of a user equipment (UE). Location requests from an external client for a UE may be supported using control plane signaling. Location reports to the external client may be supported with user plane signaling to minimize delay. An event report with location information may be sent using user plane signaling to the external client (or Application Function) directly or via a Location Management Function (LMF) or Gateway Mobile Location Center (GMLC) or via both the LMF and GMLC. If the LMF or GMLC receive an event report from the UE, the LMF or GMLC may send the event report to the external client with user plane signaling. A periodic or triggered cumulative event report may be sent to the LMF, (Continued)

GMLC or external client using control plane signaling to confirm the periodic or triggered location request remains operational.

30 Claims, 14 Drawing Sheets

(56) References Cited

U.S. PATENT DOCUMENTS

| | | | |
|---|---|---|---|
| 9,026,093 | B2 | 5/2015 | Niemenmaa et al. |
| 9,119,028 | B2 | 8/2015 | Edge et al. |
| 9,154,907 | B2 | 10/2015 | Edge et al. |
| 9,237,417 | B2 | 1/2016 | Marshall et al. |
| 9,838,838 | B2 | 12/2017 | Rhee et al. |
| 10,057,877 | B2 | 8/2018 | Lee et al. |
| 10,080,098 | B1 | 9/2018 | Edge |
| 10,383,081 | B2 | 8/2019 | Edge et al. |
| 10,462,610 | B1 | 10/2019 | Irish et al. |
| 10,547,421 | B2 | 1/2020 | Palanivelu et al. |
| 10,966,209 | B2 | 3/2021 | Edge et al. |
| 11,212,779 | B2 | 12/2021 | Patel et al. |
| 2005/0136942 | A1 | 6/2005 | Timiri et al. |
| 2012/0295623 | A1 | 11/2012 | Siomina et al. |
| 2013/0059610 | A1 | 3/2013 | Siomina et al. |
| 2013/0311764 | A1 | 11/2013 | Alpert et al. |
| 2014/0094188 | A1 | 4/2014 | Kazmi et al. |
| 2016/0302228 | A1 | 10/2016 | Kazmi et al. |
| 2016/0309379 | A1 | 10/2016 | Pelletier et al. |
| 2017/0276761 | A1 | 9/2017 | Park et al. |
| 2017/0332192 | A1 | 11/2017 | Edge |
| 2018/0091196 | A1 | 3/2018 | Frenne et al. |
| 2018/0139763 | A1 | 5/2018 | Bitra et al. |
| 2018/0199160 | A1 | 7/2018 | Edge |
| 2018/0262868 | A1 | 9/2018 | Edge |
| 2018/0279182 | A1 | 9/2018 | Sang et al. |
| 2019/0028170 | A1 | 1/2019 | Zhang et al. |
| 2019/0222286 | A1 | 7/2019 | Miao |
| 2019/0281588 | A1 | 9/2019 | Zhang et al. |
| 2020/0196101 | A1 | 6/2020 | Edge |
| 2021/0127386 | A1 | 4/2021 | Edge et al. |
| 2021/0320769 | A1 | 10/2021 | Cha et al. |
| 2021/0377721 | A1* | 12/2021 | Zhou ............... H04W 8/065 |
| 2023/0148189 | A1* | 5/2023 | Lee ................. H04W 64/00 455/456.1 |

FOREIGN PATENT DOCUMENTS

| | | |
|---|---|---|
| TW | 201808043 A | 3/2018 |
| WO | WO-2007002303 | 1/2007 |
| WO | 2011130562 | 10/2011 |
| WO | 2014124106 A1 | 8/2014 |
| WO | 2016048906 A1 | 3/2016 |
| WO | WO-2016154009 A1 | 9/2016 |
| WO | WO-2017134295 A1 | 8/2017 |
| WO | WO-2017203487 A1 | 11/2017 |
| WO | WO-2018064537 | 4/2018 |
| WO | WO-2018069311 A1 | 4/2018 |
| WO | WO-2018159967 A1 | 9/2018 |
| WO | 2020123812 A1 | 6/2020 |

OTHER PUBLICATIONS

3GPP TS 23.273: "3rd Generation Partnership Project, Technical Specification Group Services and System Aspects, SG System (SGS) Location Services (LCS), Stage 2 (Release 18)", 3GPP TS 23.273, V18.0.0, 3rd Generation Partnership Project (3GPP), Mobile Competence Centre, 650, Route Des Lucioles, F-06921, Sophia-Antipolis Cedex, France, Dec. 21, 2022, pp. 1-121, XP052234732, pp. 21-28, pp. 34-37.

Edge S., et al., (Qualcomm Incorporated): "Support of a UE User Plane Connection to an LCS Client or AF for Periodic or Triggered 5GC-MT-LR Event Reporting", 3GPP TSG-SA WG2 Meeting #154, S2-2210922, 3rd Generation Partnership Project (3GPP), Mobile Competence Centre, 650, Route Des Lucioles, F-06921, Sophia-Antipolis Cedex, France, vol. 3GPP SA 2, No. Toulouse, FR, Nov. 14, 2022-Nov. 18, 2022, Nov. 4, 2022, 15 Pages, XP052224989, pp. 2-10.

International Search Report and Written Opinion—PCT/US2023/021046—ISA/EPO—Sep. 8, 2023.

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15)", 3GPP TS 36.305, 3rd Generation Partnership Project, Mobile Competence Centre, 650, Route Des Lucioles, F-06921, Sophia-Antipolis Cedex, France, vol. RAN WG2, No. V15.1.0, Sep. 27, 2018, pp. 1-87, XP051487411, paragraphs [0001], [04.1], [06.2], [07 .1], [OB. 2]-[OB.4].

* cited by examiner

SYSTEMS AND METHODS FOR PERIODIC AND TRIGGERED EVENT REPORTING VIA USER PLANE

RELATED APPLICATIONS

This application claims the benefit of U.S. Provisional Application No. 63/382,207, filed Nov. 3, 2022, entitled "SYSTEMS AND METHODS FOR PERIODIC AND TRIGGERED EVENT REPORTING VIA USER PLANE", and U.S. Provisional Application No. 63/338,877, filed May 5, 2022, entitled "SYSTEMS AND METHODS FOR PERIODIC AND TRIGGERED EVENT REPORTING VIA USER PLANE", both of which are assigned to the assignee hereof, and incorporated herein in their entirety by reference.

BACKGROUND

Background Field

The present disclosure relates generally to communication, and more specifically to techniques for supporting location services for user equipments (UEs).

Relevant Background

Certain location use cases require very low latency in providing a location of a mobile device to an external client. Examples include smart (automated) factories where the positions of tools and objects being fabricated may need to be known with an accuracy of 1 to 10 centimeters (or less) and with a latency of less than 100 milliseconds (ms); drones where a location accurate to 1 meter may need to be known within a second or less; public safety first responders at a dangerous location (e.g. inside a burning or partially collapsed building); and user cases associated with locating vehicles and/or pedestrians (referred to as V2X). Other user cases associated with high location accuracy may also have low latency requirements due to a rapid deterioration in location accuracy for a moving object. For example, even at only 4 mph (normal walking speed), an object would move 1.79 meters in 1 second, thereby nullifying the benefit of 1 meter location accuracy after less than 1 second.

Current location solutions defined for wireless networks can have a latency of 1 to 10 seconds or more and no location solutions defined for wireless networks are known with a latency consistently less than 1 second with the exception of solutions using mobile device-based positioning where the mobile device or an App in the mobile device is also the client for the determined locations.

SUMMARY

Methods and apparatus are described for reducing end-to-end latency in a location determination of a user equipment (UE). Location requests from an external client for a UE may be supported using control plane signaling. Location reports to the external client may be supported with user plane signaling to minimize delay. An event report with location information may be sent using user plane signaling to the external client (or Application Function) directly or via a Location Management Function (LMF) or Gateway Mobile Location Center (GMLC) or via both the LMF and GMLC. If the LMF or GMLC receive an event report from the UE, the LMF or GMLC may send the event report to the external client with user plane signaling. A periodic or triggered cumulative event report may be sent to the LMF, GMLC or external client using control plane signaling to confirm the periodic or triggered location request remains operational.

An example method performed by a user equipment (UE) for locating the UE in a wireless network, according to this disclosure, may comprise receiving a request for locating the UE, wherein the request for locating the UE comprises a periodic or triggered location request based on a location request initiated by an external client or application function (AF), includes one or more criteria for providing a cumulative event report, and is received by the UE using control plane signaling. The method also may comprise, responsive to detecting a periodic or triggered event, the periodic or triggered event occurring at a plurality of different times: obtaining first location information for the UE, and reporting the first location information for the UE to the external client or AF using user plane signaling. The method also may comprise responsive to determining that at least one of the one or more criteria for providing the cumulative event report has been met, sending the cumulative event report to the external client or AF using control plane signaling.

An example user equipment (UE) may comprise: one or more transceivers, one or more memories, one or more processors communicatively coupled with the one or more transceivers and the one or more memories, wherein the one or more processors are configured to receive, via the one or more transceivers, a request for locating the UE, wherein the request for locating the UE: comprise a periodic or triggered location request based on a location request initiated by an external client or application function (AF), include one or more criteria for providing a cumulative event report, and is received by the UE using control plane signaling. The one or more processors further may be configured to, responsive to detecting a periodic or triggered event, the periodic or triggered event occurring at a plurality of different times: obtain first location information for the UE, and report the first location information for the UE to the external client or AF using user plane signaling. The one or more processors further may be configured to responsive to determining that at least one of the one or more criteria for providing the cumulative event report has been met, sending the cumulative event report, via the one or more transceivers, to the external client or AF using control plane signaling.

An example apparatus for locating a user equipment (UE) in a wireless network, according to this disclosure, may comprise means for receiving a request for locating the UE, wherein the request for locating the UE: comprises a periodic or triggered location request based on a location request initiated by an external client or application function (AF), includes one or more criteria for providing a cumulative event report, and is received by the UE using control plane signaling. The apparatus further may comprise means for, responsive to detecting a periodic or triggered event, the periodic or triggered event occurring at a plurality of different times: obtaining first location information for the UE, and reporting the first location information for the UE to the external client or AF using user plane signaling. The apparatus further may comprise means for, responsive to determining that at least one of the one or more criteria for providing the cumulative event report has been met, sending the cumulative event report to the external client or AF using control plane signaling.

According to this disclosure, an example non-transitory computer-readable medium stores instructions for locating a user equipment (UE) in a wireless network, the instructions comprising code for receiving a request for locating the UE, wherein the request for locating the UE comprises a periodic or triggered location request based on a location request initiated by an external client or application function (AF), including one or more criteria for providing a cumulative event report, and is received by the UE using control plane signaling. The instructions further may comprise code for responsive to detecting a periodic or triggered event, the periodic or triggered event occurring at a plurality of different times: obtaining first location information for the UE, and reporting the first location information for the UE to the external client or AF using user plane signaling. The instructions further may comprise code for responsive to determining that at least one of the one or more criteria for providing the cumulative event report has been met, sending the cumulative event report to the external client or AF using control plane signaling.

BRIEF DESCRIPTION OF THE DRAWINGS

An understanding of the nature and advantages of various embodiments may be realized by reference to the following figures.

Figure 1A:
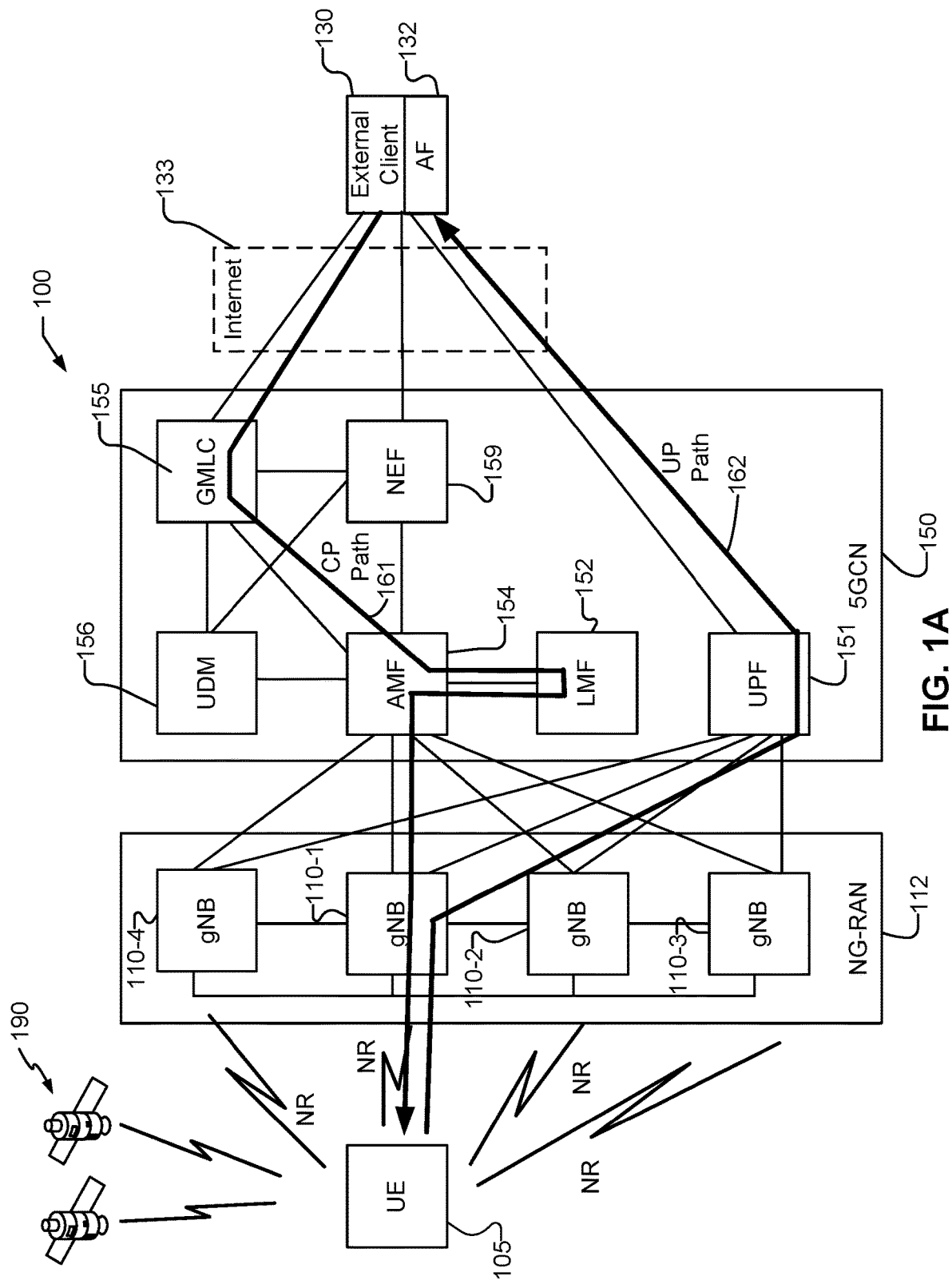
FIGS. 1A and 1B are simplified block diagrams illustrating a network architecture to support a Very Low Latency Location Service (VLLLS) for a non-roaming UE.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as 110-1, 110-2, 110-3 etc. Similarly, multiple instances of an element 155 may be indicated as 155A, 155B, 155C etc. When referring to such an element using only the first number, any instance of the element is to be understood (e.g. elements 110 in the previous example would refer to elements 110-1, 110-2 and 110-3, and element 155 in the previous example would refer to elements 155A, 155B and 155C).

DETAILED DESCRIPTION

Obtaining the location of a user equipment (UE) (sometimes referred to as a "target UE") in a wireless network may be useful for many applications including, for example, emergency calls, personal navigation, asset tracking, locating a friend or family member, etc. Certain types of use cases, however, require low or very low latency (e.g. less than 1 second and in some cases less than 100 milliseconds (ms). Components of end-to-end latency in providing a location estimate of a target UE to an external client may include the following: A) delay in sending a location request from the external client to a controlling entity in a wireless network (e.g. a location server); B) delay in requesting location measurements or a location estimate by the controlling entity from other entities in the wireless network and/or from the target UE; C) delay in obtaining location measurements; D) delay in transferring location measurements to a location computation entity (e.g. the controlling entity); E) delay in computing a location estimate from the location measurements; and F) delay in transferring the computed location estimate to the external client.

To minimize these components, one or more of the following approaches may be taken. Components (A) and (B) may be performed once only or infrequently to establish an ongoing series of location measurements for a target UE (e.g. via periodic or triggered location). Component (C) may be reduced via tracking in which a location measuring entity (e.g. the target UE or a base station in the wireless network) relies on previous measurements to establish a small window within which any new measurement can be expected to be obtained. For example, a Time of Arrival (TOA) measurement which requires correlation of a received signal with previously known signal content may be obtained much faster when the TOA (and any Doppler) is already known fairly accurately by a measuring entity. Component (C) may also be reduced by obtaining measurements in parallel from multiple entities, such as from multiple base stations, rather than in series from just one entity. Component (D) may be reduced by assigning a location computation entity close to the source(s) of location measurement, such as assigning the target UE for location computation when the UE provides at least some of the measurements, or assigning a location computation entity in a Radio Access Network (RAN) rather than in a Core Network (CN) when the UE and/or base stations in the RAN provide the measurements. Component (E) may be reduced by using a faster processor for location computation—e.g. as in a location server or higher-end target UE. Component (F) may be reduced by employing user plane transfer of a location estimate directly from a location computation entity to an external client, which may avoid extra delay caused by intermediate (e.g. control plane) entities and may use high bandwidth.

One difference between the above approaches and that of traditional location solutions lies in the reduction of delay for Components (A), (B) and (F). Since the establishment of an ongoing series of location measurements for a target UE needs to be performed once only or infrequently, it may be supported using traditional control plane procedures and signaling. However, since delivery of location reports to an external client adds latency to every location report, it may be supported with user plane signaling and procedures which may minimize delay. As part of the solution, when a controlling entity is part of a Radio Access Network (RAN) (e.g. to reduce delay for component (D)), efficient means for periodically changing the controlling entity and reconfiguring location measurements may be supported when a target UE moves to a new serving cell or new serving base station.

Solutions for reducing latency in providing location to an external client and improving signaling efficiency are desirable. Currently no solutions have been identified to achieve the desired reduction in latency and improvement of signaling efficiency. For existing control plane (CP) location in a 5G network, for example, a location result or event report (for triggered and periodic location) is transferred successively from the user equipment (UE) to a gNB, from the gNB to an Application Management Function (AMF), from the AMF to a Location Management Function (LMF), from the LMF to a Gateway Mobile Location Center (GMLC), and from the GMLC to a Location Services (LCS) Client or Application Function (AF) (via an Network Exposure Function (NEF)). The four or five intermediate entities with five or six interfaces increase both latency and signaling.

A solution, as discussed herein, is applied to event reporting for periodic and triggered location and makes use of a user plane (UP) connection for transfer of an event report from a UE directly to an LCS Client or AF (1 hop). The solution herein also allows for event reporting over a user plane connection via an LMF or GMLC (2 hops) or via the LMF and the GMLC (3 hops). The solution as discussed herein includes a defined protocol layering on the user plane (Internet Protocol (IP), Transmission Control Protocol (TCP), Transport Layer Security (TLS), supplementary services). Support for the UP connection is provided through an LMF or GMLC, where use of an LMF allows more position methods to be used and use of a GMLC allows better security and monitoring of event reports. The solution additionally allows a UE to report the status of the UP event reporting to an LMF and GMLC via CP. Moreover, the procedures for event reporting are defined and fit within the existing CP procedures. Further, cancellation of event reporting and LMF change are supported via CP.

Figure 1B:
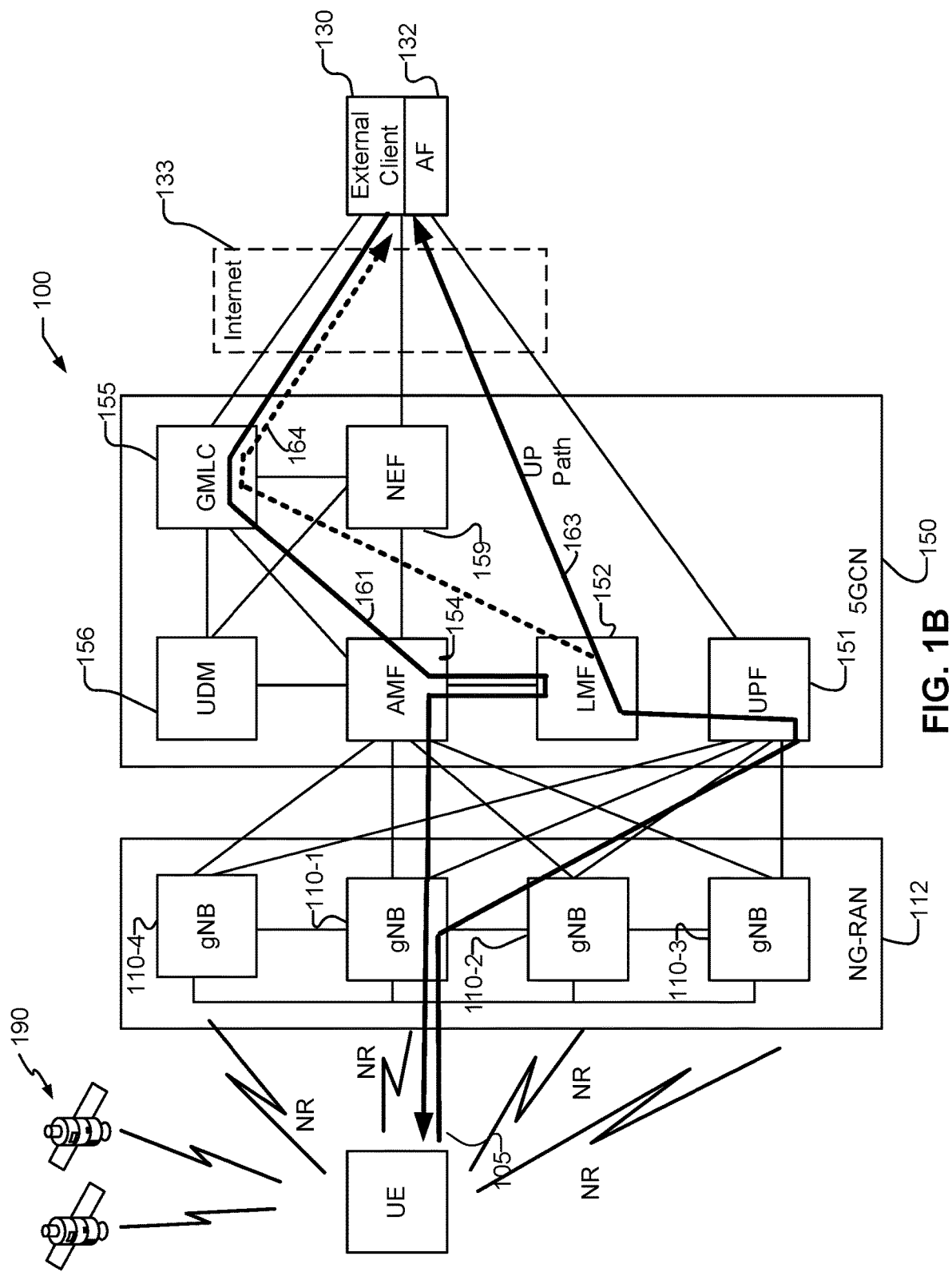
Figure 2:
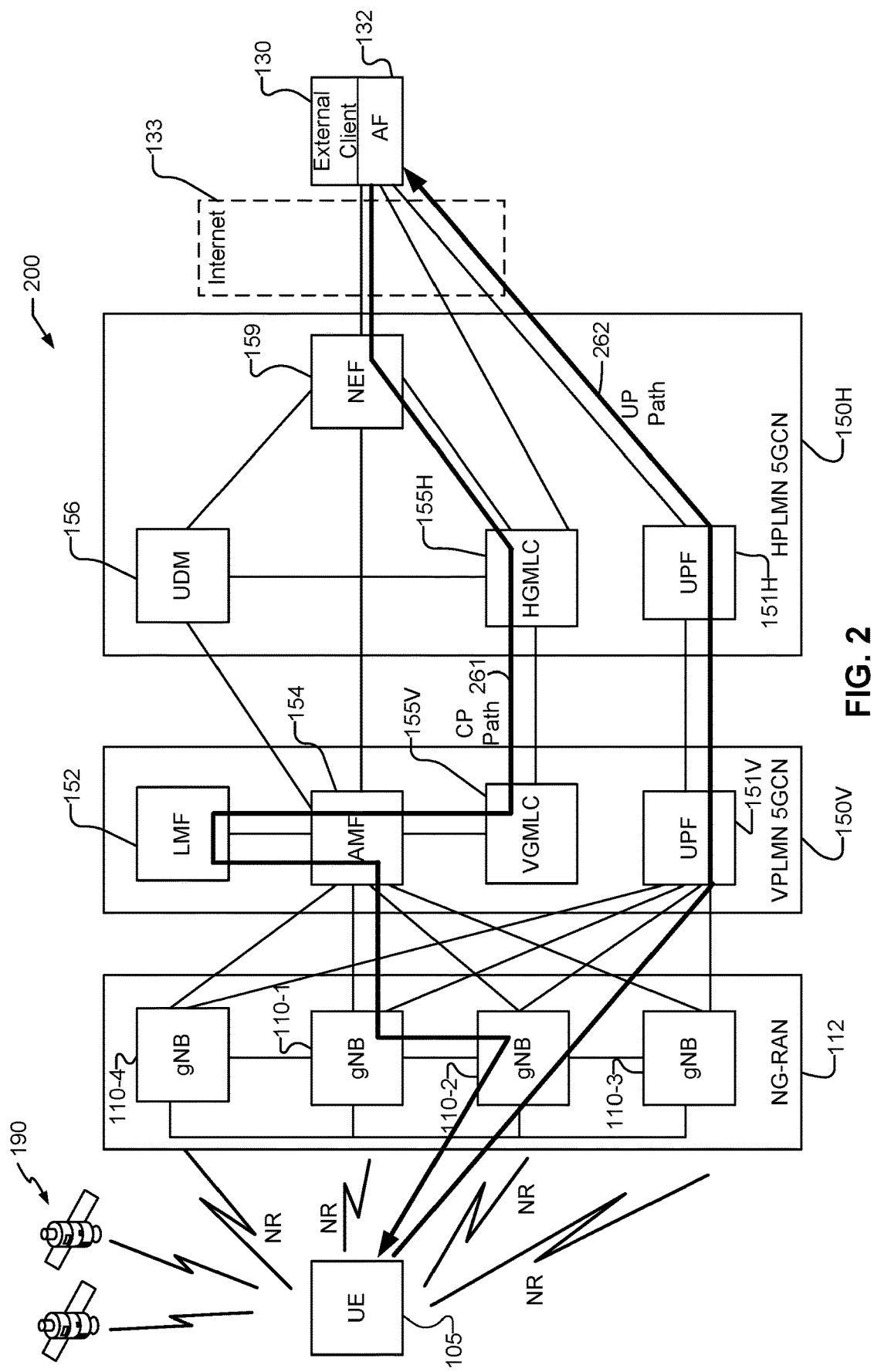
FIG. 2 is a simplified block diagram illustrating a network architecture to support a VLLLS for a roaming UE.

FIGS. 1A and 1B show a network architecture to support a Very Low Latency Location Service (VLLLS) for a non-roaming UE and FIG. 2 shows a corresponding network architecture for a roaming UE. FIGS. 1A, 1B and 2 may align, or partially align, with location solutions defined by the Third Generation Partnership Project (3GPP). It can be noted that references to particular 3GPP Technical Specifications are referred to as "3GPP TS" or just "TS" followed by the number of the corresponding Technical Specification.

FIG. 1A illustrates a communication system 100 that comprises a UE 105, which is referred to here as a "target UE", since UE 105 may be the target of a location request. FIG. 1A also shows components of a Fifth Generation (5G) network, which may also be referred to as a 5G System (5GS), comprising a Next Generation RAN (NG-RAN) 112, which includes base stations (BSs), sometimes referred to as New Radio (NR) NodeBs or gNBs, 110-1, 110-2, 110-3, and 110-4 (collectively and generically referred to herein as gNBs 110), and a 5G Core Network (5GCN) 150 that is in communication with an external client 130. As shown by block 133 in FIG. 1A (where dashed lines show an optional feature), communication between the external client 130 and 5GCN 150 optionally may be made via the Internet. A 5G network may also be referred to as a New Radio (NR) network; NG-RAN 112 may be referred to as an NR RAN or a 5G RAN; and 5GCN 150 may be referred to as a Next Generation (NG) Core network (NGC). The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

FIG. 1A also shows a serving gNB (gNB) 110-1 for the target UE 105, and some neighbor gNBs (gNBs) 110-2, 110-3, 110-4. An gNB 110 may be any gNB 110 which is able to receive and measure uplink (UL) signals transmitted by the target UE 105 and/or is able to transmit a downlink (DL) reference signal (RS) that can be received and measured by the target UE 105.

Entities in the NG-RAN 112 which transmit DL reference signals (RSs) to be measured by a target UE 105 for a particular location session are referred to generically as "Transmission Points" (TPs) and can include one or more of the gNB 110-1, gNB 110-2 (if different to the gNB 110-1), and gNBs 110-3, 110-4. In some cases, gNB 110-1, gNB 110-2, gNBs 110-3, 110-4 may each include multiple TPs (e.g. where each TP is associated with a distinct cell and/or uses a distinct antenna or distinct set of antenna elements).

Entities in the NG-RAN which receive and measure UL signals (e.g. an RS) transmitted by a target UE 105 for a particular location session are referred to generically as "Reception Points" (RPs) and can include one or more of the gNB 110-1, gNB 110-2 (if different to the gNB 110-1), and gNBs 110-3, 110-4. In some cases, gNB 110-1, gNB 110-2, gNBs 110-3, 110-4 may each include multiple RPs (e.g. where each RP is associated with a distinct cell and/or uses a distinct antenna or distinct set of antenna elements).

It should be noted that FIG. 1A provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1A illustrates a 5G-based network, similar network implementations and configurations may be used for other communication technologies, such as 3G, Long Term Evolution (LTE), and IEEE 802.11 WiFi etc. For example, where a Wireless Local Area Network (WLAN), e.g., IEEE 802.11 radio interface, is used, the UE 105 may communicate with an Access Network (AN), as opposed to an NG-RAN, and accordingly, component 112 is sometimes referred to herein as an AN or as a Radio Access Network (RAN), denoted by the term "RAN," "(R)AN," or "(R)AN 112". In the case of an AN (e.g. IEEE 802.11 AN), the AN may be connected to a Non-3GPP Interworking Function (N3IWF) (e.g. in 5GCN 150) (not shown in FIG. 1A), with the N3IWF connected to AMF 154.

The target UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. The target UE 105 may be a standalone device or may be embedded in another device, e.g., a factory tool or a vehicle, that is to be monitored or tracked. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GCN 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GCN 150 not shown in FIG. 1A, or possibly via a Gateway Mobile Location Center (GMLC) 155, and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, or receiving wireless signals from a cellular transceiver, in the NG-RAN 112, such as a gNB 110. A transceiver provides user and control planes protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from SVs 190 belonging to a Satellite Positioning System (SPS) or Global Navigation Satellite System (GNSS) such as GPS, GLONASS, Galileo or Beidou and/or may include measurements of signals received from terrestrial transmitters fixed at known locations (e.g., such as gNBs 110). UE 105, gNB 110-2 or a separate location server (e.g. LMF 152), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, Angle of Departure (AOD), Angle of Arrival (AOA), multi-cell Round Trip signal propagation Time (multi-RTT), or Enhanced Cell ID (ECID) or combinations thereof. In some of these techniques (e.g. A-GNSS, AFLT and OTDOA), pseudoranges or timing differences may be measured at UE 105 relative to three or more terrestrial transmitters (e.g. gNBs 110) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 105.

A location server, such as the LMF 152, may be capable of providing positioning assistance data to UE 105 including, for example, information regarding signals to be measured (e.g., expected signal timing, signal coding, signal frequencies, signal Doppler), locations and identities of terrestrial transmitters (e.g. gNBs 110) and/or signal, timing and orbital information for GNSS SVs 190 to facilitate positioning techniques such as A-GNSS, AFLT, OTDOA, AOD, multi-RTT and ECID. The facilitation may include improving signal acquisition and measurement accuracy by UE 105 and, in some cases, enabling UE 105 to compute its estimated location based on the location measurements. For example, LMF 152 may comprise an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g. a gNB 110) such as transmission power and signal timing. A UE 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (Rx-Tx), or a round trip signal propagation time (RTT) between UE 105 and a cellular transceiver (e.g. a gNB 110) or a local transceiver (e.g. a WiFi access point (AP)). A UE 105 may transfer these measurements to a location server, such as LMF 152, to determine a location for UE 105, or in some implementations, may use these measurements together with assistance data (e.g. terrestrial almanac data or GNSS satellite data such as GNSS Almanac and/or GNSS Ephemeris information) received from an LMF 152, or broadcast by a base station (e.g. a gNB 110) in NG-RAN 112, to determine a location for UE 105.

In the case of OTDOA, UE 105 may measure a Reference Signal Time Difference (RSTD) between signals such as a positioning reference signal (PRS), Cell specific Reference Signal (CRS), or Tracking Reference Signal (TRS) transmitted by nearby pairs of transceivers and base stations (e.g. gNBs 110). An RSTD measurement may provide the time of arrival difference between signals (e.g. TRS, CRS or PRS) received at UE 105 from two different transceivers. The UE 105 may return the measured RSTDs to LMF 152, which may compute an estimated location for UE 105 based on known locations and known signal timing for the measured transceivers. In some implementations of OTDOA, the signals used for RSTD measurements (e.g. PRS or CRS signals) may be accurately synchronized by the transceivers to a common universal time such as GPS time or Coordinated Universal Time (UTC), e.g., using a GPS or GNSS receiver at each transceiver to accurately obtain the common universal time.

In some implementations, network based position methods may be used to locate a target UE 105. With these methods, entities in a network such as gNBs 110 may measure UL signals transmitted by UE 105. The UL signals may include or comprise UL reference signals such as UL positioning reference signals (PRSs). The entities obtaining the location measurements (e.g. gNBs 110) may then transfer the location measurements to a location server (e.g. LMF 152), which may compute a location for the target UE 105. Examples of UL location measurements can include an RSSI, RSRP, RSRQ, TOA, Rx-Tx, AOA and RTT. An example of a network based position method may be an Uplink Time Difference of Arrival (UTDOA) method which may make use of TOA measurements obtained by gNBs 110 whose timing is accurately synchronized or aligned with a common absolute time such as GPS time. Another example network based position method may be ECID which may make use of any of RSSI, RSRP, RSRQ, TOA, Rx-Tx, AOA and RTT measurements.

With a UE assisted position method, UE 105 may obtain location measurements (e.g. measurements of RSSI, Rx-Tx, RTT, RSTD, RSRP and/or RSRQ for gNBs 110, or measurements of GNSS pseudorange, code phase and/or carrier phase for SVs 190) and send the measurements to an entity performing a location server function, such as LMF 152 for computation of a location estimate for UE 105. With a UE based position method, UE 105 may obtain location measurements (e.g. which may be the same as or similar to location measurements for a UE assisted position method) and may additionally compute a location of UE 105 (e.g. with the help of assistance data received by point to point means from a location server such as LMF 152 or broadcast by a gNB 110).

An estimate of a location of the UE 105 may be referred to as a location, location estimate, location fix, fix, position, position estimate or position fix, and may be geographic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. The location may be expressed as an absolute location estimate for the UE 105, such as location coordinates or address, or as a relative location estimate for the UE 105, such as a distance and direction from a previous location estimate or from a known absolute location. The location of the UE 105 may include a linear velocity, an angular velocity, a linear acceleration, an angular acceleration, an angular orientation for the UE 105, e.g., the orientation of the UE 105 relative to a fixed global or local coordinate system, an identification of a trigger event for locating the UE 105, or some combination of these. For example, trigger events may include an area event, a motion event or a velocity event. An area event, for example, may be the UE 105 moving into a defined area, moving out of the area and/or remaining in the area. A motion event, for example, may include movement of the UE 105 by a threshold straight line distance or threshold distance along a UE trajectory. A velocity event, for example, may include the UE 105 attaining a minimum or maximum velocity, a threshold increase and/or decrease of velocity, and/or a threshold change in direction. In the description contained herein, the use of the term location may comprise any of these variants unless indicated otherwise. When computing the location of a UE 105, it is common to solve for local x, y, and possibly z coordinates and then, if needed, convert the local coordinates into absolute ones (e.g. for latitude, longitude and altitude above or below mean sea level).

As shown in FIG. 1A, pairs of gNBs 110 in NG-RAN 112 may be connected to one another, e.g., directly as shown in FIG. 1A or indirectly via other gNBs 110. Access to the 5G network is provided to UE 105 via wireless communication between the UE 105 and one or more of the gNBs 110, which may provide wireless communication access to the 5GCN 150 on behalf of the UE 105 using 5G (e.g. NR). In FIG. 1A, the serving gNB for UE 105 (gNB) is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 1A (e.g. gNB 110-3 or gNB 110-4) may be configured to function as positioning-only beacons which may transmit signals (e.g. directional PRS) to assist positioning of UE 105 but may not receive signals from UE 105 or from other UEs.

As noted, while FIG. 1A depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the 5GCN 150. Thus, the NG-RAN 112 may include any combination of gNBs, evolved Node Bs (eNBs), or other types of base stations or access points. As an example, NG-RAN 112 may include one or more next generation eNBs (ng-eNBs), not shown, which provide LTE wireless access to UE 105 and may connect to entities in 5GCN 150 such as AMF 154.

The gNBs 110 and/or the ng-eNB can communicate with the Access and Mobility Management Function (AMF) 154, which, for positioning functionality, may communicate with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105 supported by the UPF 151. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

The LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of arrival (AOA), angle of departure (AOD), multi-RTT, WLAN positioning, UTDOA, and/or other position methods. The LMF 152 may also process location service requests for the UE 105, e.g., received directly or indirectly from the GMLC 155 or NEF 159. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using signal measurements for signals transmitted by wireless nodes, and assistance data provided to the UE 105).

The GMLC 155 may support a location request for the UE 105 received from an external client 130 and may forward such a location request to a serving AMF 154 for UE 105. The AMF 154 may then forward the location request to LMF 152 which may obtain one or more location estimates for UE 105 (e.g. according to the request from external client 130) and may return the location estimate(s) to AMF 154, which may return the location estimate(s) to external client 130 via GMLC 155. GMLC 155 may contain subscription information for an external client 130 and may authenticate and authorize a location request for UE 105 from external client 130. GMLC 155 may further initiate a location session for UE 105 by sending a location request for UE 105 to AMF 154 and may include in the location request an identity for UE 105 and the type of location being requested (e.g. such as a current location or a sequence of periodic or triggered locations).

The AMF 154 and the gNBs 110 may communicate using a New Radio Position Protocol A (NRPPa). NRPPa may be defined in 3GPP TS 38.455 and may be the same as, similar to, or an extension of the LTE Positioning Protocol A (LPPa) defined in 3GPP TS 36.455, with NRPPa messages being transferred between the gNBs 110 and the AMF 154. Further, the AMF 154 and UE 105 may communicate using the LTE Positioning Protocol (LPP) defined in 3GPP Technical Specification (TS) 37.355, where LPP messages are transferred between the UE 105 and the serving AMF 154 via the serving gNB 110-1 for UE 105. For example, LPP messages may be transferred between the AMF 154 and the UE 105 using a 5G Non-Access Stratum (NAS) protocol. The LPP protocol may be used to support positioning of UE 105 using UE assisted and/or UE based position methods such as Assisted GNSS (A-GNSS), Real Time Kinematic (RTK), Wireless Local Area Network (WLAN), Observed Time Difference of Arrival (OTDOA), AOD, AOA, multi-RTT, and/or Enhanced Cell Identity (ECID). The NRPPa protocol may be used to support positioning of UE 105 using network based and network assisted position methods such as ECID and multi-RTT (e.g. when used with measurements obtained by a gNB 110 or received from a gNB 110 from UE 105) and/or may be used by LMF 152 to obtain location related information from gNBs 110 such as parameters defining positioning reference signal (PRS) transmission from gNBs 110 for support of OTDOA, AOD and multi-RTT.

GNBs 110 may communicate with AMF 154 using a Next Generation Application Protocol (NGAP), e.g. as defined in 3GPP TS 38.413. NGAP may enable AMF 154 to request a location of a target UE 105 from an gNB 110-1 for target UE 105 and may enable gNB 110-1 to return a location for UE 105 to the AMF 154.

GNBs 110 may communicate with one another using an Xn Application Protocol (XnAP), e.g. as defined in 3GPP TS 38.423. XnAP may allow one gNB 110 to request another gNB 110 to obtain UL location measurements for a target UE 105 and to return the UL location measurements. XnAP may also enable a gNB 110 to request another gNB 110 to transmit a downlink (DL) RS or PRS to enable a target UE 105 to obtain DL location measurements of the transmitted DL RS or PRS. In some implementations, XnAP may be used to transport location related messages belonging to a higher protocol level (e.g. NRPPa) between gNBs 110 to request UL location measurements and/or transmission of DL RS or PRS signals, in which case XnAP may only be used as a transport protocol between pairs of gNBs 110.

A gNB (e.g. gNB 110-1) may communicate with a target UE 105 using a Radio Resource Control (RRC) protocol, e.g. as defined in 3GPP TS 38.331. RRC may allow a gNB 110 (e.g. gNB 110-1) to request location measurements from the target UE 105 of DL RS s or DL PRSs transmitted by the gNB 110 and/or by other gNBs 110 and to return the location measurements. RRC may also enable a gNB 110 (e.g. gNB 110-1) to request the target UE 105 to transmit an UL RS or PRS to enable the gNB 110 or other gNBs 110 to obtain UL location measurements of the transmitted UL RS or PRS. A gNB (e.g. gNB 110-1) may further communicate with a target UE 105 using lower protocol levels, e.g., layer 1 (L1) and/or layer 2 (L2) protocol levels, which may be used by the UE 105 to return location measurements. RRC may also be used to transport one or more LPP messages between a UE 105 and gNB 110-1, where the one or more LPP messages rather than RRC are used to request location measurements from the target UE 105 and/or to request the target UE 105 to transmit an UL RS or PRS.

Information provided by the gNBs 110 to the LMF 152 using NRPPa may include timing and configuration information for PRS transmission and location coordinates of the gNBs 110. The LMF 152 can then provide some or all of this information to the UE 105 as assistance data in an LPP message.

An RRC and/or an LPP message sent from LMF 152 to UE 105 may instruct the UE 105 to do any of a variety of things, depending on desired functionality. For example, the LPP and/or RRC message could contain an instruction for the UE 105 to obtain measurements for GNSS (or A-GNSS), WLAN, AOD, multi-RTT and/or OTDOA (or some other position method). In the case of OTDOA, the LPP or RRC message may instruct the UE 105 to obtain one or more measurements (e.g. RSTD measurements) of PRS signals transmitted within particular cells supported by particular gNBs 110 (or supported by one or more ng-eNBs or eNBs). The UE 105 may send the measurements back to the LMF 152 in LPP message.

In some embodiments, LPP may be augmented by or replaced by an NR or NG positioning protocol (NPP or NRPP) which supports position methods such as OTDOA, multi-RTT and ECID for NR radio access. For example, an LPP message may contain an embedded NPP message or may be replaced by an NPP message.

A gNB 110 in NG-RAN 112 may also broadcast positioning assistance data to UEs such as UE 105.

As illustrated in FIG. 1A, a Unified Data Management (UDM) 156 may be connected to the GMLC 155. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management.

To support services including location services from external clients 130 for Internet of Things (IoT) UEs, a Network Exposure Function (NEF) 159 may be included in 5GCN 150. An NEF may also be referred to as a Service Capability Exposure Function (SCEF), e.g. for a UE 105 with LTE access to an EPC rather than 5G NR radio access to 5GCN 150. The NEF 159 may support secure exposure of capabilities and events concerning 5GCN 150 and UE 105 to an external client 130 (which may then be referred to as an Application Function (AF)) and may enable secure provision of information from external client 130 to 5GCN 150. In the context of location services, NEF 159 may function to obtain a current or last known location for a UE 105, may obtain an indication of a change in location for a UE 105, or an indication of when a UE 105 becomes available (or reachable). An external client 130 may access NEF 159 directly or may access a Services Capability Server (SCS, not shown in FIG. 1A), which may access NEF 159 on behalf of external client 130 in order to provide location information to the external client 130 for UE 105 via the SCS. The NEF 159 may be connected to the GMLC 155 to support last known location, current location and/or deferred periodic and triggered location for the UE 105. If desired, the NEF 159 may include, or may be combined with, the GMLC 155.

The User Plane Function (UPF) 151 may support voice and data bearers for UE 105 and may enable UE 105 voice and data access to other networks such as the Internet. UPF 151 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering.

FIG. 1A illustrates an example of user plane signaling path with bold arrow 162 that may be used for reporting the UE location to the external client 130 or AF 132.

FIG. 1B illustrates the communication system 100 shown in FIG. 1A, but illustrates another example of user plane signaling path with bold arrow 163 that may be used for reporting the UE location to the external client 130 or AF 132 through the LMF 152 or, as shown by the dotted line 164, through the LMF 152 and GMLC 155. For example the LMF 152 may determine a location estimate for the UE 105 (e.g. using UE assisted position methods) based on the location information provided to the LMF 152 by the UE 105. The LMF 152 may then send the location estimate to the external client 130 or AF 132 directly (on the path 163) or via the GMLC 155 (on the path 164). In some implementations, the user plane signaling path may pass through the GMLC 155 only (not shown in FIG. 1B).

FIG. 2 illustrates a communication system 200 that is similar to the communication system 100 shown in FIG. 1A, but supports location for a roaming UE 105. In the communication system 200, the core network 5GCN 150V that is in communication with the UE 105 via the NG-RAN 112 is part of a visited network, i.e., Visited Public Land Mobile Network (VPLMN), which is in communication with a home network 5GCN 150H, which is part of Home Public Land Mobile Network (HPLMN). In communication system 200, the VPLMN 5GCN 150V includes the AMF 154 in communication with the LMF 152. The AMF 154 is also in communication with the UDM 156, e.g., in the HPLMN 5GCN 150H. The VPLMN 5GCN 150V also includes a Visited Gateway Mobile Location Center (VGMLC) 155V, which is similar to the GMLC 155 in the non-roaming communication system 100 of FIG. 1A, and is designated as 155V to indicate that it is located in the visited network for UE 105. As illustrated in FIG. 2, the VGMLC 155V connects to the AMF 154 in the VPLMN 5GCN 150V.

As illustrated, HPLMN 5GCN 150H may include a Home GMLC (HGMLC) 155H that may be connected to the VGMLC 155V (e.g., via the Internet). The HGMLC 155H may be similar to the GMLC 155 in the non-roaming communication system of FIG. 1A, and is designated as 155H to indicate that it located in the home network for UE 105. The VGMLC 155V and HGMLC 155H may be sometimes collectively and generically referred to herein as GMLC 155. The HGMLC 155H is in communication with the external client 130, as well as the UDM 156 in the HPLMN 150H. The HGMLC 155H may provide location access to UE 105 on behalf of external clients such as external client 130.

The HPLMN 5GCN 150H may also include the NEF 159 which may be connected to HGMLC 155H. One or more of HGMLC 155H and NEF 159 may be connected to external client 130, e.g., through another network, such as the Internet. In some cases, a Requesting GMLC (RGMLC) located in another PLMN (not shown in FIG. 2) may be connected to HGMLC 155H (e.g., via the Internet) in order to provide location access to UE 105 on behalf of external clients connected to the RGMLC.

As further illustrated, HPLMN 5GCN 150H may include a Home UPF 151H that may be connected to a Visited UPF 151V in the VPLMN 5GCN 150V (e.g., via the Internet). The UPFs 151H and 151V may be similar to the UPF 151 in the non-roaming communication system of FIG. 1A, and are designated as 151H and 151V to indicate, respectively, location in the home network and visited network for UE 105.

Low latency location may be supported via user plane positioning, which may apply, for example, to event reporting for a periodic or triggered deferred 5G Core Mobile Terminated Location Request (5GC-MT-LR). The target UE 105 may use a user plane connection to report events to the LCS Client 130 or AF 132, either directly or via the LMF 152 or GMLC 155 (or H-GMLC 155H). When reporting directly to the LCS Client 130 or AF 132 or reporting via a GMLC 155 or H-GMLC 155H, the UE 105 may send a supplementary services event report over the user plane connection with a location estimate included. This may significantly reduce end-to-end latency because the event report does not need to be transferred via control plane connections through the NG-RAN 112, AMF 154, LMF 152, GMLC 155, and possibly the NEF 159. Signaling efficiency is likewise increased. When reporting via the LMF 152, the UE 105 sends a supplementary services event report over the user plane connection to the LMF 152 with one or more LPP messages included in the event report. The LMF 152 then verifies or determines a location estimate and sends the event report with the location estimate to the LCS Client 130 or AF 132 over a second user plane connection. This can still reduce latency and increase signaling efficiency. The control plane associations between the UE 105 and LMF 152, the LMF 152 and GMLC 155 (V-GMLC 155V/H-GMLC 155H) and GMLC 155 (H-GMLC 155H) and LCS Client 130 or NEF 159 and AF 132 are retained to allow the status of event reporting to be conveyed to the GMLC 155 (H-GMLC 155H) (and NEF 159 if used) and to support cancellation of event reporting using the existing control plane procedures.

FIGS. 1A, 1B, and 2 also illustrate at a high level via the bold arrows how a location session may be established and how location reporting may be supported. To establish (or to cancel) a location session for a target UE 105, a control plane signaling path may be used as shown by the bold arrows 161 and 261. With a control plane (CP) path, control plane procedures are used in which an external client 130 sends a location request to a GMLC 155 (or HGMLC 155H when roaming) or to an NEF 159, which forwards the location request to a serving AMF 154 for the target UE 105 (e.g. via VGMLC 155V in the case of a roaming target UE 105). The serving AMF 154 then forwards the location request to the LMF 152, which is returned to the AMF 154 and sent to an gNB 110-1 for the target UE 105 which either acts as the gNB for the location session or forwards the location request to a separate gNB 110-2. FIGS. 1A, 1B, and 2 only show the location establishment via the GMLC 155 or HGMLC 155H and VGMLC 155V and not via the NEF 159.

For location reporting, the UE 105 may use a user plane connection to report events to the LCS Client 130 or AF 132, either directly, as shown by the bold arrows 162 and 262 in FIGS. 1A and 2, or via the LMF 152 and/or GMLC 155, as shown by the bold arrows 163 and 164 in FIG. 1B. With a user plane signaling path, the UE 105 may send a location report to external client 130 or AF 132 via the gNB 110-1, UPF 151 (as illustrated in FIGS. 1A and 1B) or UPF 151V and UPF 151H if the target UE 105 is roaming (as illustrated in FIG. 2) and possibly the Internet 133. The user plane connection can use ciphering and mutual authentication when the two endpoints are not in the same trust domain.

As illustrated with UP paths 163 and 164 shown in FIG. 1B, the UP connection may be provided through the LMF 152 and/or GMLC 155, where use of the LMF 152 allows more position methods to be used and use of the GMLC 155 allows better security and monitoring of event reports. A similar UP connection may be provided for a roaming UE 105 through the LMF 152 and/or H-GMLC 155H in FIG. 2.

For location reporting via a user plane from the UE 105, no restrictions on the target UE 105 mobility state may be needed.

Figure 3A:
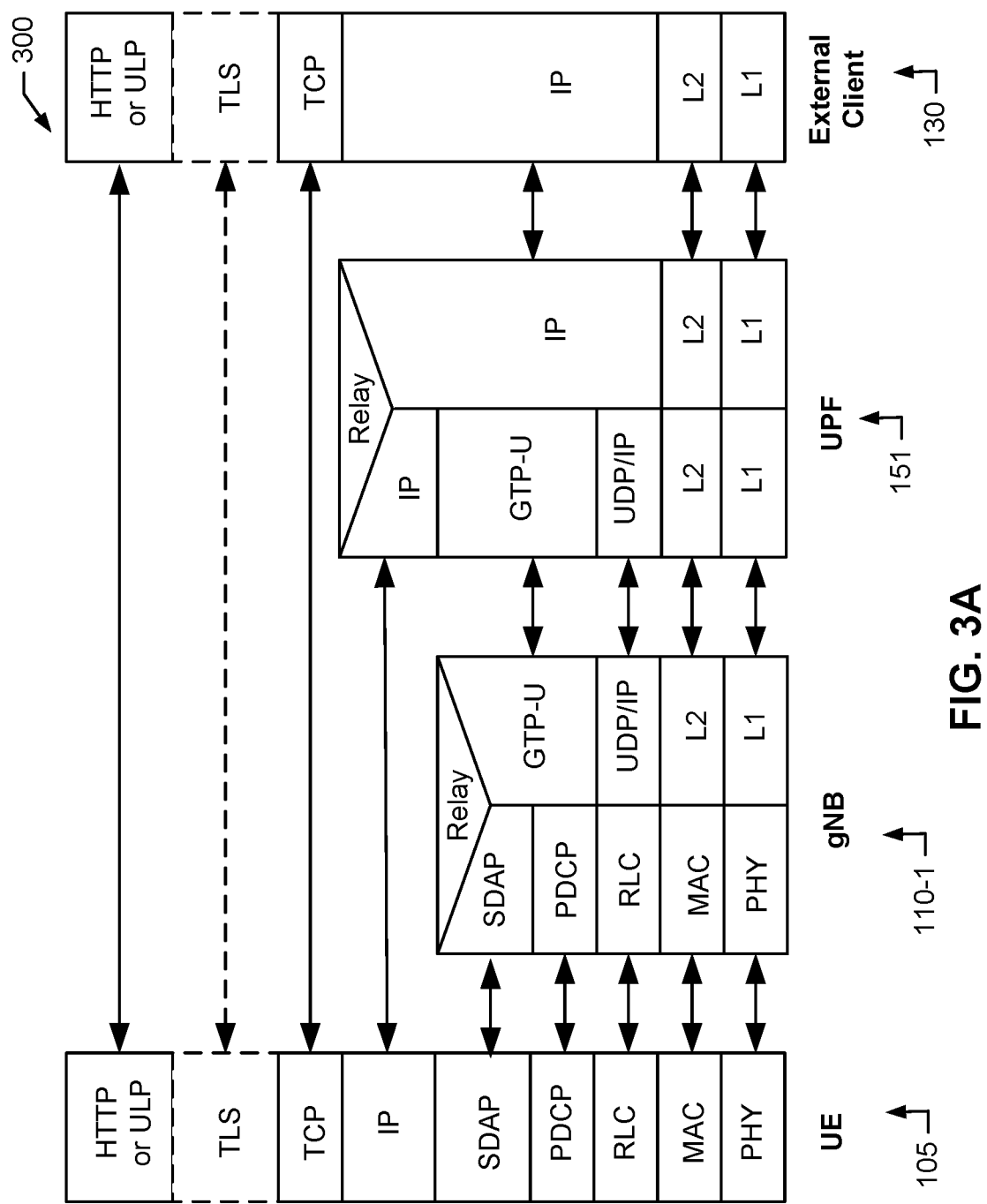
FIG. 3A is a representation of protocol layering which may be used when a target UE transfers location reports for the target UE to an external client.

FIG. 3A shows protocol layering 300 which may be used when the target UE 105 transfers location reports to the external client 130 or AF 132 via user plane signaling. UE 105 may send location reports to the external client 130 or AF 132 using IP, TCP, optionally transport layer security (TLS) and possibly the Hypertext Transfer Protocol (HTTP) (e.g. HTTP/2) or SUPL ULP. To send location reports as far as the UPF 151, the UE 105 may use a PDU session between the UE 105 and UPF 151 using protocols defined by 3GPP for this purpose, including an NR physical layer (PHY), a Medium Access Control (MAC) protocol, a Radio Link Control (RLC) protocol, a Packet Data Convergence Protocol (PDCP), a Service Data Protocol (SDAP), GTP-U and UDP/IP. An advantage of using ULP in FIG. 3A can be widespread existing support of ULP in many UEs 105 to support the OMA SUPL location solution. Adapting ULP support in a UE 105 to enable a combined control plane and user plane location solution as described herein may then have low UE 105 implementation impact. Information, referred to here as "location context information", may be needed in participating entities (e.g. UE 105 and gNBs 110) to support transmission of UL and DL RSs, obtain UL and DL location measurements, transfer location measurements to a gNB 110, and/or to deliver location reports to the external client 130.

Figure 3B:
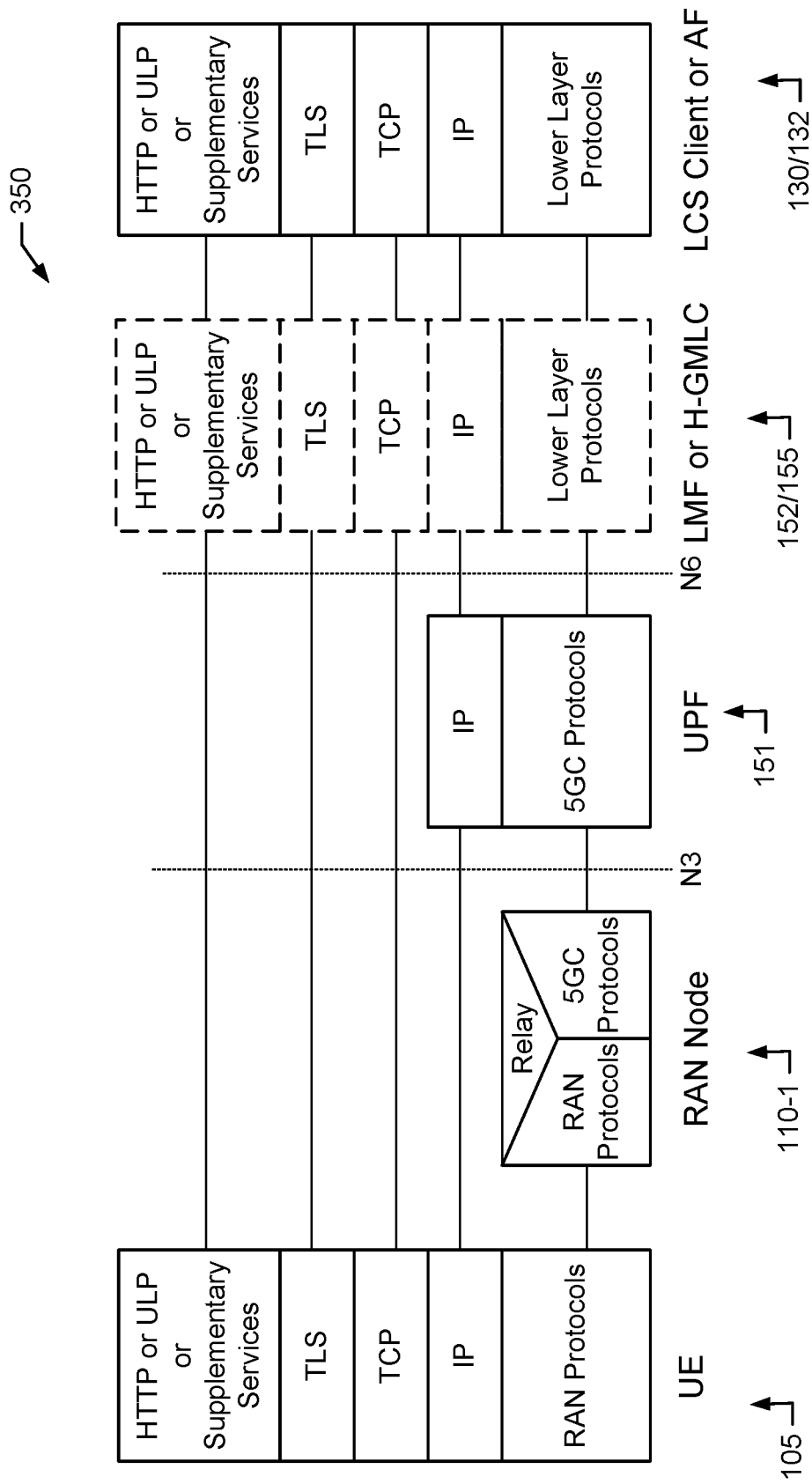
FIG. 3B is a representation of protocol layering which may be used when a target UE transfers location reports for the target UE directly to an external client or via a Location Management Function (LMF) or Gateway Mobile Location Center (GMLC) using user plane signaling.

FIG. 3B shows protocol layering 350 which may be used when the target UE 105 transfers location reports directly to the external client 130 or AF 132 or optionally via the LMF 152 and/or H-GMLC 155 using user plane signaling. The protocol layering is similar to that in FIG. 3A with the UE 105 sending location reports to the external client 130 or AF 132 using IP, TCP, optionally TLS and one of HTTP, SUPL ULP or a supplementary services protocol. Location event reports are transferred from the UE 105 to the LCS Client 130 or AF 132 using data transport through the UPF 151. Transfer can be direct or can be via an LMF 152 and/or H-GMLC 155 (shown with dotted lines). Transfer via an LMF 152 allows the LMF 152 to determine or verify a location estimate and, if needed, exchange LPP messages with the target UE 105 via user plane to perform positioning of the target UE 105. Transfer via an H-GMLC 155 enables the H-GMLC 155 to monitor event reporting by the target UE 105 and to avoid direct UE 105 to LCS Client 130 or AF 132 data interaction which might be a security risk to either entity. A version of TLS (e.g. TLS 1.2) may be used to enable secure data connection. The LMF 152 and/or H-GMLC 155 shown in FIG. 3B are only present when event reports are transferred through the LMF 152 and/or H-GMLC 155 and not directly to the LCS Client 130 or AF 132. The event reports may each include a type of event indication, a location estimate for the UE 105 and a time of the event or a time of the location. When event reports are transferred via the LMF 152, UE 105 may send an event report formatted according to a supplementary services protocol (e.g. a protocol defined in 3GPP TS 24.080), which LMF 152 may convert to an event report formatted according to HTTP or SUPL ULP for transfer to the H-GMLC 155 (if present on the user plane path) and to the LCS Client 130 or AF 132.

Figure 4A:
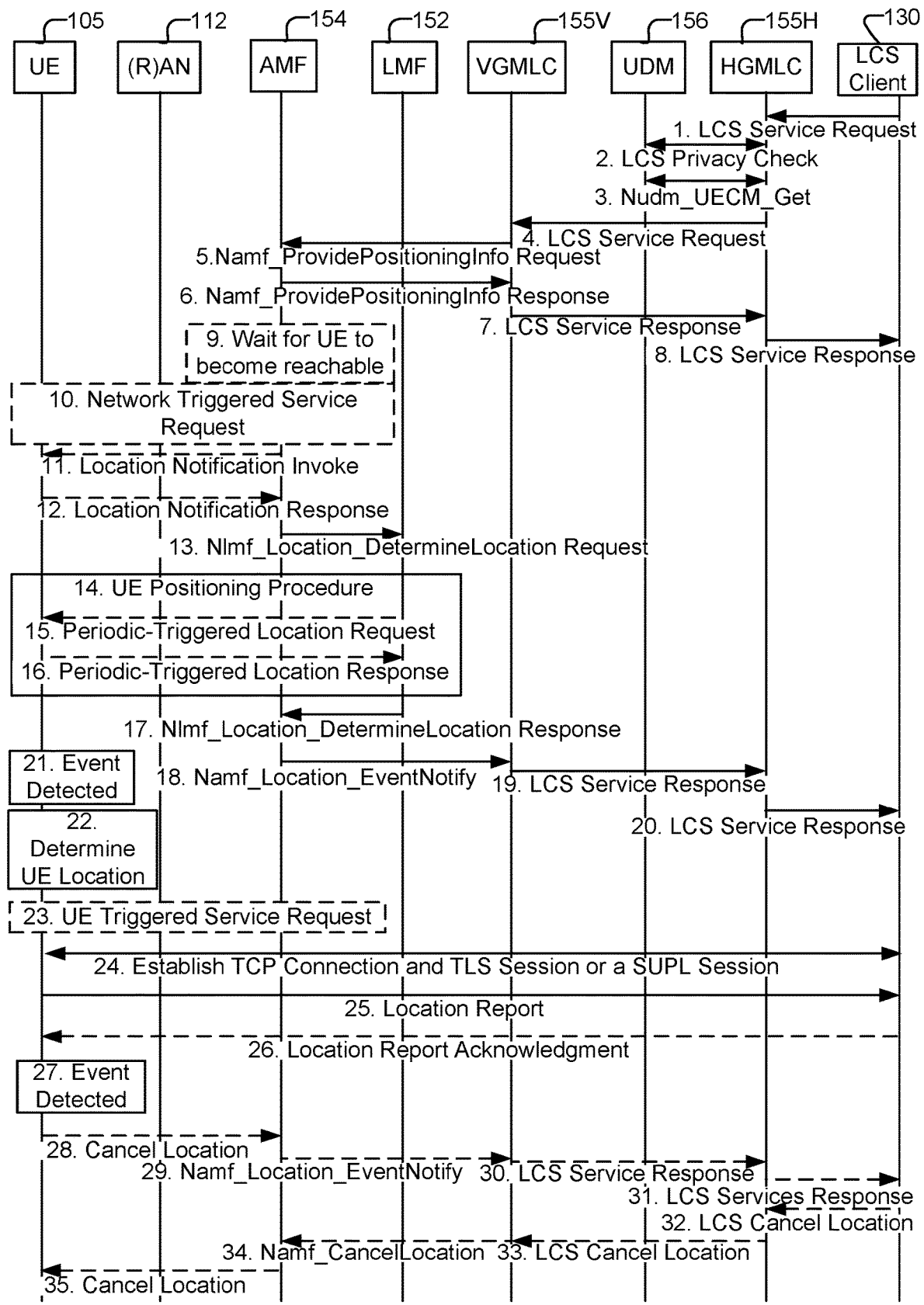
FIG. 4A shows a location session establishment and reporting procedure to support a VLLLS that is applicable for a target UE supporting location reporting.

FIG. 4A shows a procedure for one example of location reporting by a target UE 105 using a user plane. FIG. 4A applies to a roaming target UE 105 as in communication system 200 in FIG. 2. A procedure for a non-roaming target UE 105 as in communication system 100 in FIG. 1A could comprise a subset of the procedure shown in FIG. 4A. Operations within the procedure are shown as numerals in FIG. 4A and referred to herein as stages. This convention is also used in other figures described hereafter.

At stage 1 in FIG. 4A, an external Location Services (LCS) client 130 sends a location request for a periodic or triggered location event for a target UE 105 to an HGMLC 155H in the HPLMN 5GCN 150H for the target UE 105. The location request provides the type of location reporting being requested and associated parameters. For periodic location, the request includes the time interval between successive location reports, the total number of reports and a location QoS. For triggered reporting for an area event, the request includes details of the target area, whether the trigger event to be reported is the target UE 105 being inside, entering or leaving the target area, whether event reporting shall include UE location estimates and if so a location QoS and the duration of reporting. For triggered reporting for a motion event, the request includes a threshold linear distance for triggering a location report, whether event reporting shall include UE location estimates and if so a location QoS and the duration of reporting. More than one type of location reporting may be requested at stage 1 (e.g. external client 130 may request periodic location and triggered location reporting for the area event or motion event). The location request may also include user plane information. The user plane information may include a request to send location reports via a user plane and an address to which location reports should be sent via the user plane (e.g. an IP address, FQDN or URI) and security information. The security information may include a ciphering and/or authentication key (or keys) including public or private keys, and an identification for the external client 130 which may be usable to establish a TCP connection and/or TLS session between the target UE 105 and the external client 130. The location request sent at stage 1 may also include a location session reference to identify location reports sent later at stage 25.

It is noted that the external LCS client 130 may instead be a Network Function (NF) or an Application Function (AF) which accesses the HGMLC 155H via an NEF 159.

At stage 2 in FIG. 4A, the HGMLC 155H may verify target UE 105 privacy requirements by querying the UDM 156 for privacy subscription information for UE 105 and then verifying that external client 130 is allowed to receive location information for UE 105. If the target UE 105 is not allowed to be located, subsequent stages are skipped.

At stage 3, the HGMLC 155H invokes an Nudm_UECM_Get service operation towards the home UDM 156 of the target UE 105 with the GPSI or SUPI of the target UE 105 to obtain the serving AMF 154 address and optionally a VGMLC 155V address and current access type(s) for the target UE 105.

It is noted that HGMLC 155H may also query the HSS of the target UE 105 (not shown in FIG. 4A) for an address of a serving Mobility Management Entity (MME) as described in 3GPP TS 23.271. A deferred EPC-MT-LR procedure for Periodic and Triggered Location described in 3GPP TS 23.271 may then be performed instead of stages 4-35 in FIG. 4A—e.g. if the HSS returns an MME address but the UDM 156 does not return an AMF address. In this case, the deferred EPC-MT-LR procedure may also invoke location reporting via a user plane by UE 105 which may be similar to that described below for FIG. 4A.

At stage 4, if a VGMLC 155V address was not returned in stage 3, the HGMLC 155H may use a Network Repository Function (NRF) service in the HPLMN 5GCN 150H to select an available VGMLC 155V in the VPLMN 5GCN 150V, based on a VPLMN identification contained in the AMF 154 address received in stage 3. The HGMLC 155H forwards the location request to the VGMLC 155V and includes the AMF 154 address, the target UE 105 identity (e.g. SUPI), any access type(s) received at stage 3 and any privacy requirements for the target UE 105. The HGMLC 155H also includes a contact address for the HGMLC 155H (also referred to as a Notification Target Address, e.g. a URI) and a Location Deferred Request (LDR) reference number (also referred to as a Notification correlation ID) to be used for event and location reporting at stages 19 and 30. The HGMLC 155H further includes any user plane information received at stage 1 and may include other information received at stage 1 such as a location session reference and the type(s) of periodic and/or triggered location reported that were requested.

At stage 5, the VGMLC 155V invokes an Namf_Location_ProvidePositioningInfo Request service operation to forward the location request including all information received at stage 4 to the serving AMF 154. The VGMLC 155V may optionally determine an LMF 152 and then includes the LMF 152 identity in the request sent to the AMF 154.

At stages 6-8, if the AMF 154 supports a deferred location request for periodic or triggered location, the AMF 154 returns an acknowledgment to the external LCS client 130, via the VGMLC 155V and HGMLC 155H, indicating that the request for location was accepted. The VGMLC 155V may optionally release resources for the location request at this point.

It is noted that as an optional optimization, a VGMLC 155V may not be used. In this case, instead of performing stages 4-7, the HGMLC 155H invokes the Namf_Location_ProvidePositioningInfo Request service operation to forward the location request directly to the AMF 154. The AMF 154 then returns an acknowledgment directly to the HGMLC 155H.

At stage 9, if the target UE 105 is not currently reachable (e.g. is using DRX or PSM), the AMF 154 waits for the target UE 105 to become reachable.

It is noted that in the event of mobility of the target UE 105 to another AMF, or to an Enhanced Packet Core (EPC) supporting LTE access, when the target UE 105 becomes reachable, the old AMF 154 can return an event indication to the HGMLC 155H as at stages 18 and 19 and may include the address of the new serving AMF or new serving MME if known. If a new serving AMF or MME is not known, the HGMLC 155H can repeat stages 2 and 3 to query the UDM 156 and HSS for the new AMF or new MME address. The HGMLC 155H can then restart the procedure from stage 3.

At stage 10, once the target UE 105 is reachable, the AMF 154 performs a network-triggered service request if needed to move the target UE 105 into a CM Connected state.

At stage 11, the AMF 154 may notify the target UE 105 and verify UE privacy requirements based on any privacy requirements received from the HGMLC 155H in stages 4-5. If this occurs, the AMF 154 sends a supplementary services Location Notification invoke to the target UE 105.

At stage 12, if stage 11 was performed for UE privacy verification, the target UE 105 notifies a user of UE 105 (if there is a user) of the location request and verifies user permission if UE privacy is to be verified. The target UE 105 then returns a supplementary services Location Notification response to the AMF 154 indicating whether the user (or UE 105 if there is no user) grants or withholds permission for the location request.

At stage 13, the AMF 154 determines an LMF 152, e.g. based on an LMF 152 identity provided by the VGMLC 155V in stage 5, the type of location request (e.g. a QoS) and/or current UE access type(s). The AMF 154 then invokes an Nlmf_Location_DetermineLocation Request service operation towards the LMF 152 to initiate a request for deferred UE location. The AMF 154 includes all the information received in stage 5 including the HGMLC 155H contact address, LDR reference number and user plane information. The request also includes an LCS Correlation identifier, a serving cell identity for UE 105, the external client 130 type and may include a required QoS and GAD shapes supported by the external client 130.

At stage 14, the LMF 152 instigates a UE positioning procedure (e.g. using a UE Assisted and UE Based Positioning Procedure described in 3GPP TS 23.273 and/or a Network Assisted Positioning Procedure described in 3GPP TS 23.273). During this procedure, the LMF 152 may request and obtain the target UE 105 positioning capabilities (e.g. which may indicate the type(s) of periodic and triggered location supported by the target UE 105, the access types supported by the target UE 105 for event reporting and whether the target UE 105 supports location reporting via a user plane). The LMF 152 may also obtain the target UE 105 location—e.g. if an initial UE 105 location is requested by external client 130 at stage 1.

At stage 15, and as part of stage 14, the LMF 152 sends a Periodic-Triggered Location Request to the target UE 105 via the serving AMF 154 by invoking an Namf_Communication_N1N2MessageTransfer service operation. The Periodic-Triggered Location Request carries the location request information received from the AMF 154 at stage 13, including the HGMLC 155H contact address, LDR reference number and user plane information. The Periodic-Triggered Location Request may indicate the allowed access types for location reporting at stage 25 (e.g. one or more of NR, LTE access to 5GCN 150V, LTE access to an EPC for the VPLMN, WLAN (e.g. IEEE 802.11 WiFi)

access to 5GCN 150V) and may indicate certain allowed or required location measurements (or a location estimate) at stage 22 for each location event reported (e.g. based on the positioning capabilities of the target UE 105 obtained as part of stage 14 and the allowed access types).

At stage 16, if the request in stage 15 can be supported, the target UE 105 returns an acknowledgment to the LMF 152 as part of stage 14, which is transferred via the serving AMF 154 and delivered to the LMF 152 using an Namf_Communication_N1MessageNotify service operation. The target UE 105 may indicate in the acknowledgment whether user plane location reporting can be supported. The remaining stages here assume that location reporting via a user plane can be supported. When location reporting via a user plane cannot be supported, the procedure may continue according to a periodic and triggered 5GC-MT-LR procedure in which location reports are returned to the external client 130 via control plane signaling.

It is noted that the Periodic-Triggered Location Request sent at stage 15 and its acknowledgment at stage 16 may be messages for a positioning protocol (e.g. LPP) or may be messages for a separate protocol (e.g. a supplementary services protocol). In the latter case, each message may carry an embedded positioning protocol message to enable the LMF 152 to request or allow specific location measurements from the target UE 105 and/or specific position methods for UE based location.

At stage 17, the LMF 152 invokes an Nlmf_Location_DetermineLocation Response service operation towards the AMF 154 to respond to the request at stage 13. The response includes any location obtained at stage 14, a confirmation of whether periodic or triggered location was successfully activated in the target UE 105 according to stages 15 and 16, and an indication that user plane location reporting will be used. The LMF 152 may then release all resources for the location request and cease support for the procedure.

At stage 18, the AMF 154 invokes an Namf_Location_EventNotify service operation towards the VGMLC 155V and includes any location received at stage 17 and a confirmation of whether periodic or triggered location was successfully activated in the target UE 105, and an indication of user plane location reporting. The VGMLC 155V may be the same VGMLC 155V used in stages 5 and 6 or may be a different VGMLC 155V. In the case of a different VGMLC 155V, the AMF 154 includes the HGMLC 155H contact address and LDR reference number. The AMF 154 may then release all resources for the location request and cease support for the procedure.

At stage 19, the VGMLC 155V forwards the response received at stage 18 to the HGMLC 155H using the HGMLC 155H contact address received at stage 18 (for a different VGMLC 155V) or received and stored at stage 4 (for the same VGMLC 155V) and includes the LDR reference number. The VGMLC 155V may then release all resources for the location request and cease support for the procedure.

It is noted that as an optional optimization, instead of performing stages 18 and 19, the AMF 154 may invoke an Namf_Location_EventNotify service operation directly towards the HGMLC 155H (e.g. if a VGMLC 155V is not used or if the VGMLC 155V ceases support after stage 7).

At stage 20, the HGMLC 155H forwards the response to the external LCS client 130.

At stage 21, the target UE 105 monitors for occurrence of the trigger or periodic event(s) requested in stage 15. When a trigger event is detected and if the target UE 105 is camped on or connected to (or can otherwise access) an access type allowed by the LMF 152 at stage 15, the target UE 105 proceeds to stage 22. If the target UE 105 cannot access an allowed access type, the target UE 105 may skip reporting the trigger event or may report the trigger event at a later time when an allowed access type becomes available, according to requirements received from the LMF 152 at stage 15.

At stage 22, the target UE 105 obtains location measurements and from these determines a location estimate and possibly other location information (e.g. the target UE velocity and/or orientation) as requested at stage 15. The UE 105 may obtain location measurements of DL signals (e.g. PRS or TRS signals) transmitted, according to a control plane, by one or more gNBs 110 in NG-RAN 112. UE 105 may also obtain location measurements of signals from other sources (e.g. GNSS SVs 190 and/or WLAN APs) and/or from sensors in UE 105. UE 105 may then determine a location estimate for UE 105 from these location measurements and possibly using assistance data broadcast by and received from NG-RAN 112 or received using control plane signaling (e.g. at an earlier time) from an LMF 152 in 5GCN 150.

At stage 23, the target UE 105 performs a service request if in CM idle state or a Resume Request if in RRC Inactive state.

At stage 24, if there is currently no TCP connection and/or TLS session between the target UE 105 and the external client 130, the target UE 105 establishes a TCP connection and optional TLS session with the external client 130. This may typically occur once only any time after stage 15. For location reporting directly to the external client 130, the target UE 105 may use an address of the external client 130 received at stage 15 to establish the TCP connection, and any ciphering and authentication key(s) received at stage 15 to establish a TLS session.

In a variant of stage 24, when ULP is used to send location reports rather than HTTP, the UE 105 may establish a SUPL session with the external client 130 if there is currently no SUPL session, which may include establishing a TCP connection and optional TLS session as described above. In this variant, UE 105 may indicate (e.g. at the ULP level and optionally in a SUPL START or SUPL TRIGGERED START message sent to the external client 130 as part of stage 24) that the SUPL session is associated with the location request at stage 1. For example, UE 105 may include a location session reference sent by external client 130 at stage 1 in a SUPL START or SUPL TRIGGERED START message sent to external client 130 as part of stage 24.

At stage 25, the target UE 105 sends a location report (also referred to as an event report) to the external client 130. The location report may include some or all of the location information determined at stage 22 as well as a target UE 105 identity (e.g. GPSI or SUPI), a location session reference, an address or indication of the external client 130, and/or the type of triggered or periodic event detected at stage 21. The location report may be sent as a user plane message according to the protocol layering described for FIG. 3A. If HTTP is used to send the location report at stage 25, the location report may comprise an HTTP POST message. If ULP is used to send the location report at stage 25, the location report may comprise a ULP message such as a SUPL POS message, SUPL POS INIT message or a SUPL REPORT message.

At stage 26, optionally, the external client 130 may return an acknowledgment to the target UE 105. An acknowledgment may not be needed if an acknowledgement at the TCP level is considered to be sufficient. In some variants, an acknowledgment at stage 26 or a separate message from the external client 130 to the UE 105 may request some change to the location reporting such as a higher or lower periodicity of location reporting, a higher or lower location QoS or cancellation of location reporting. If HTTP is used to send the location report at stage 25, the acknowledgement at stage 26 may comprise an HTTP Status 204 (no content) message or HTTP Status 200 OK message.

At stage 27, the target UE 105 continues to monitor for further periodic or trigger events and instigates stages 22-26 each time a periodic or trigger event is detected.

At stage 28, in order to cancel the location request (e.g. if the target UE 105 is powered off or if the user wishes to cancel the location), the target UE 105 performs stage 23 if needed and then sends a Cancel Location request message to the serving AMF 154 using Non-Access Stratum (NAS) control plane signaling indicating that periodic or triggered location was cancelled. The target UE 105 includes the HGMLC 155H contact address and LDR reference number.

At stages 29-31, the AMF 154 forwards the cancelation request to a VGMLC 155V, the HGMLC 155H and external LCS client 130.

At stage 32, if the external LCS client 130 wishes to cancel the periodic or triggered location, the external LCS client 130 sends a request to the HGMLC 155H.

At stages 33-34, the HGMLC 155H determines the serving AMF 154 address as in stage 3 and forwards the cancelation request to the AMF 154 either directly or via a VGMLC 155V. The HGMLC 155H includes the HGMLC 155H contact address and the LDR reference number.

At stage 35, the AMF 154 sends the cancelation request to the target UE 105 as soon as the target UE 105 becomes reachable and includes the HGMLC 155H contact address and the LDR reference number. The target UE 105 then releases all resources for the location request.

It is noted that the cancellation request sent to the target UE 105 at stage 35 could be a message for supplementary services or a NAS message.

In another variant of the techniques described here, periodic or triggered location of a target UE 105 may be requested by an external LCS client 130 and activated in the target UE 105 using control plane signaling (e.g. according to stages similar to stages 1-20 in FIG. 4A). In this variant, the periodic or triggered location of the target UE 105 may be supported using an LMF 152 in the 5GCN 150 for a serving PLMN for the target UE 105. The LMF 152 may receive a location event report from UE 105 whenever the UE 105 detects a periodic or triggered event. The LMF 152 may then optionally determine a location for the UE 105 using control plane signaling and may send a location event report containing the location (when the location is obtained) to the external client 130 via a user plane (e.g. using a TCP connection and optional TLS session between the LMF 152 and the external client 130) and possibly using HTTP or ULP. With this variant, latency in sending the location event report from LMF 152 to external client 130 may be reduced in comparison to using control plane signaling to send a location event report from LMF 152 to external client 130.

Figure 4B:
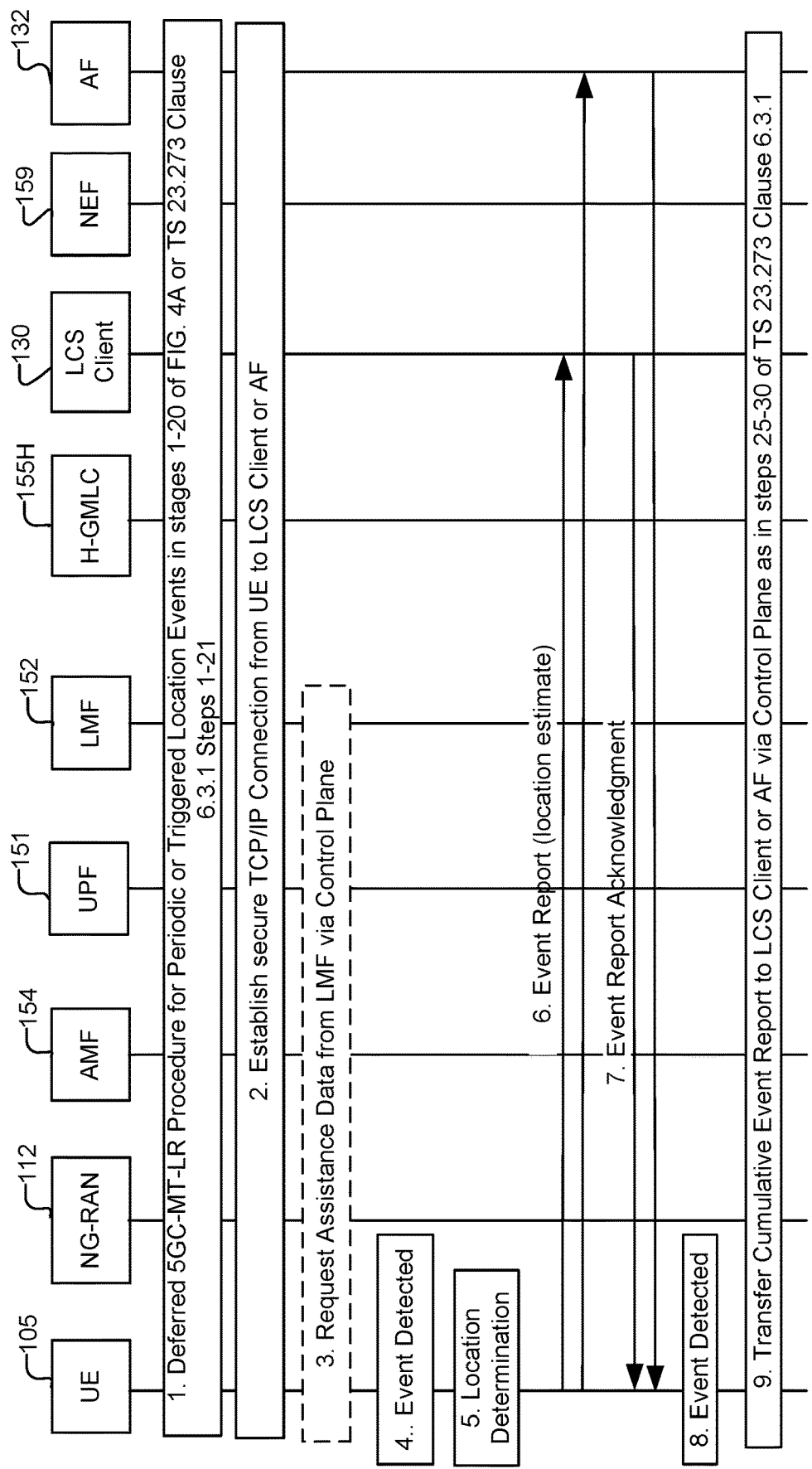
FIG. 4B shows a location reporting procedure that is applicable for a target UE supporting location reporting to an external client or application function (AF).

FIG. 4B shows a procedure for one example of location reporting by a target UE 105 using a user plane. FIG. 4B applies to a non-roaming target UE 105 as in communication system 100 in FIG. 1A. A procedure for a roaming target UE 105 as in communication system 200 in FIG. 2 may be based on the procedure shown in FIG. 4B. In FIG. 4B, the location reporting is performed using event reporting in which the location estimate is included. The procedure in FIG. 4B shows event reporting from UE 105 directly to the LCS Client 130 or AF 132 when a User Plane connection is established directly from the UE 105 to the LCS Client 130 or AF 132 with no intermediate LMF 152 or H-GMLC 155H.

At stage 1, stages 1-20 of FIG. 4A may be performed or steps 1-21 for the deferred 5GC-MT-LR procedure for periodic or triggered location events in 3GPP TS 23.273 clause 6.3.1 are performed with the following differences.

In step 1 of 3GPP TS 23.273 clause 6.3.1, the LCS Client or AF includes a request for user plane reporting in the Location Request and includes an IP address or FQDN for the user plane connection and security information to enable a secure connection.

In steps 4, 5, 14 and 16 of 3GPP TS 23.273 clause 6.3.1, the request for user plane reporting and the IP address or FQDN and the security information are forwarded in sequence to the V-GMLC (if used), AMF, LMF and target UE. The type of user plane connection (direct to the LCS Client or AF) and criteria for sending cumulative event reports at stage 9 of the procedure shown in FIG. 4B are also conveyed to the target UE from the H-GMLC. The criteria can include a periodic time interval or the sending of a certain number of event reports via user plane at stage 6 of the procedure shown in FIG. 4B.

In steps 17-21 of 3GPP TS 23.273 clause 6.3.1, the target UE indicates to the LMF, H-GMLC and LCS Client or AF whether event reporting via user plane can be supported by the target UE. If event reporting via user plane cannot be supported, the target UE uses the procedure in clause 6.3.1 of 3GPP TS 23.273 to send events reports via Control Plane.

At stage 2, the UE 105 establishes a secure TCP/IP connection to the LCS Client 130 or AF 132 using the IP address or FQDN and security information received at stage 1.

At stage 3, if the UE 105 needs assistance data to help determine a location later at stage 5, the UE 105 may send a positioning LPP request to the LMF 152 via Control Plane using the deferred Routing ID received in step 16 of the procedure in clause 6.3.1 in 3GPP TS 23.273 to identify and route the request to the correct LMF 152. The LMF 152 then provides the requested assistance data to the UE 105 by returning an LPP positioning message via Control Plane. Preferably, the UE 105 requests assistance data some time before location determination is needed to avoid increasing latency. The LMF 152 may use a LMF change procedure to forward the request for assistance data to a better LMF if the current LMF cannot provide assistance data for the current UE location (e.g. the current UE Tracking Area Identity (TAI) or Cell Global Identity (CGI)). In this case, the new LMF can return the assistance data to the UE 105 via the original LMF 152 to avoid changing the LMF association in the UE 105 and H-GMLC 155H or V-GMLC.

At stage 4, the UE 105 monitors for and detects the occurrence of a trigger or periodic event as described in stage 21 of FIG. 4A or for step 22 of the procedure in clause 6.3.1 of 3GPP TS 23.273.

At stage 5, the UE 105 obtains location measurements and determines a current location, possibly using assistance data obtained at stage 3. Obtaining a location at stage 5 limits the UE 105 to using UE based or standalone position methods. If UE assisted position methods need to be used, the LMF 152 may use the procedure described in FIG. 4D instead of the procedure in FIG. 4B.

At stage 6, the UE 105 sends a supplementary services Event Report to the LCS Client 130 or AF 132 over the secure TCP/IP Connection established at stage 2. The event report indicates the type of event being reported and includes the location determined at stage 5.

At stage 7, the LCS Client 130 or AF 132 returns a supplementary services Event Report Acknowledgment to the UE 105 over the secure TCP/IP Connection established at stage 2.

At stage 8, the UE 105 continues to monitor for and detect further trigger or periodic events as at stage 4 and repeats stages 5-7 for each detected trigger or periodic event.

At stage 9, based on the criteria received by the UE 105 for sending of cumulative event reports (e.g. the expiration of a periodic timer or the sending of certain number of event reports at stage 6 of the procedure shown in FIG. 4B), the UE 105 sends a cumulative event report to the LMF 152, H-GMLC 155H and LCS Client 130 or AF 132 over the control plane portion of the periodic or triggered deferred 5GC-MT-LR using steps 25-30 of the procedure in clause 6.3.1 of 3GPP TS 23.273. The cumulative event report indicates to the LMF 152, H-GMLC 155H and External LCS Client 130 or AF 132 that the control plane portion of the periodic or triggered deferred 5GC-MT-LR is still operational, that the UE 105 is still reporting events (e.g. is still powered on and in network coverage) and may include statistics on the events reported since the last cumulative event report was sent (e.g. the number of event reports).

Figure 4C:
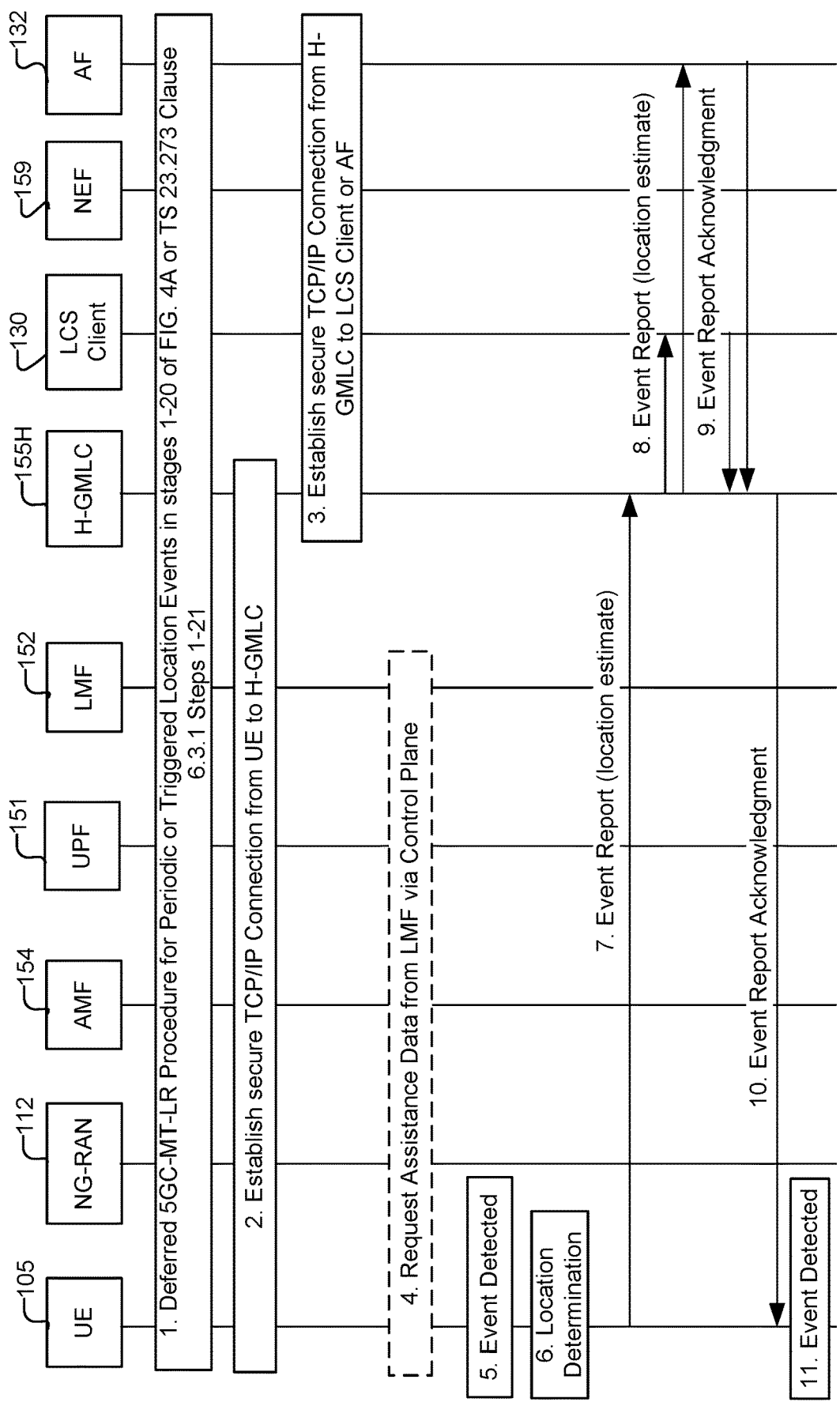
FIG. 4C shows a location reporting procedure that is applicable for a target UE supporting location reporting to an external client or application function (AF) via a GMLC.

FIG. 4C shows a procedure for one example of location reporting by a target UE 105 using a user plane. FIG. 4C applies to a non-roaming target UE 105 as in communication system 100 in FIG. 1A. A procedure for a roaming target UE 105 as in communication system 200 in FIG. 2 may be based on the procedure shown in FIG. 4C. In FIG. 4C, the location reporting is performed using event reporting in which the location estimate is included. The procedure in FIG. 4C shows event reporting from UE 105 to an LCS Client 130 or AF 132 when a User Plane connection is established to the LCS Client 130 or AF 132 via the H-GMLC 155H.

At stage 1, stages 1-20 of FIG. 4A may be performed or steps 1-21 for the deferred 5GC-MT-LR procedure for periodic or triggered location events in 3GPP TS 23.273 clause 6.3.1 are performed with the following differences.

In step 1 of 3GPP TS 23.273 clause 6.3.1, the LCS Client or AF includes a request for user plane reporting in the Location Request and includes an IP address or FQDN for the user plane connection and security information to enable a secure connection.

In steps 4, 5, 14 and 16 of 3GPP TS 23.273 clause 6.3.1, the request for user plane reporting and an IP address or FQDN and security information for the H-GMLC are forwarded in sequence to the VGMLC (if used), AMF, LMF and target UE. The H-GMLC also retains the IP address or FQDN and security information for the LCS Client or AF that was received at step 1. The type of user plane connection (via the H-GMLC) is also conveyed to the target UE from the H-GMLC.

In steps 17-21 of 3GPP TS 23.273 clause 6.3.1, the target UE indicates to the LMF, H-GMLC and LCS Client or AF whether event reporting via user plane can be supported by the target UE. If event reporting via user plane cannot be supported, the target UE uses the procedure in clause 6.3.1 of 3GPP TS 23.273 to send events reports via Control Plane.

At stage 2 of FIG. 4C, the UE 105 establishes a secure TCP/IP connection to the H-GMLC 155H using the IP address or FQDN and security information received by the UE 105 at stage 1.

At stage 3, the H-GMLC 155H establishes a secure TCP/IP connection to the LCS Client 130 or AF 132 using the IP address or FQDN and security information received by the H-GMLC 155H at stage 1.

At stage 4, if the UE 105 needs assistance data to help determine a location later at stage 6, the UE 105 performs stage 3 in FIG. 4B to obtain assistance data from the LMF 152 using control plane.

At stage 5, the UE 105 monitors for and detects the occurrence of a trigger or periodic event as described in stage 21 of FIG. 4A or for step 22 of the procedure in clause 6.3.1 of 3GPP TS 23.273.

At stage 6, the UE 105 obtains location measurements and determines a current location, possibly using assistance data obtained at stage 3. Obtaining a location at stage 6 limits the UE 105 to using UE based or standalone position methods. If UE assisted position methods need to be used, the LMF 152 may use the procedure described in FIG. 4D of the procedure in FIG. 4C.

At stage 7, the UE 105 sends a supplementary services, HTTP, or SUPL ULP Event Report to the H-GMLC 155H over the secure TCP/IP Connection established at stage 2. The event report indicates the type of event being reported and includes the location determined at stage 6.

At stage 8, the H-GMLC 155H forwards the supplementary services, HTTP, or SUPL ULP Event Report to LCS Client 130 or AF 132 over the secure TCP/IP Connection established at stage 3.

At stage 9, the LCS Client 130 or AF 132 returns a supplementary services, HTTP, or SUPL ULP Event Report Acknowledgment to the H-GMLC 155H over the secure TCP/IP Connection established at stage 3.

At stage 10, the H-GMLC 155H returns the supplementary services, HTTP or SUPL ULP Event Report Acknowledgment to the UE 105 over the secure TCP/IP Connection established at stage 2.

At stage 11, the UE 105 continues to monitor for and detect further trigger or periodic events as at stage 5 and repeats stages 6-10 for each detected trigger or periodic event.

A cumulative event report from the UE 105, as at stage 9 in the procedure shown in FIG. 4B, may not be needed when event reports are sent via the H-GMLC 155H, as the H-GMLC 155H is already aware of the status of event reporting and would know if the UE 105 had ceased reporting events.

Figure 4D:
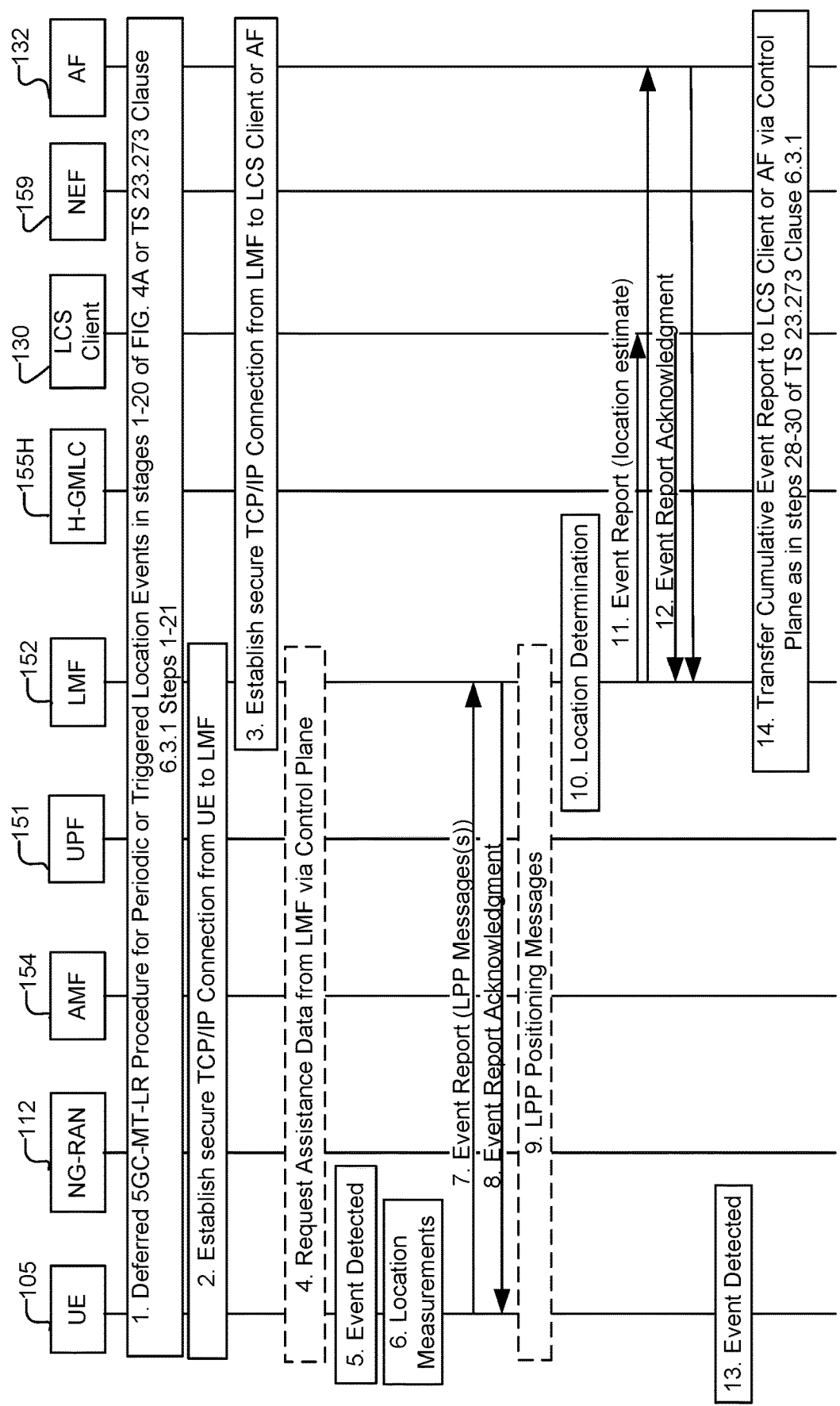
FIG. 4D shows a location reporting procedure that is applicable for a target UE supporting location reporting to an external client or application function (AF) via a location server.

FIG. 4D shows a procedure for one example of location reporting by a target UE 105 using a user plane. FIG. 4D applies to a non-roaming target UE 105 as in communication system 100 in FIG. 1A. A procedure for a roaming target UE 105 as in communication system 200 in FIG. 2 may be based on the procedure shown in FIG. 4D. In FIG. 4D, the location reporting is performed using event reporting in which the location estimate is included. The procedure in FIG. 4D shows event reporting from UE 105 to an LCS Client 130 or AF 132 when a User Plane connection is established to the LCS Client 130 or AF 132 via the LMF 152. This procedure does not support transfer of event reporting to a new LMF. While such support could be added, it could substantially increase latency as well as add more impacts for the target UE 105, LMF 152 and LCS Client 130 or AF 132. Environments where very low latency is needed can include factories, warehouses and industrial plants where a single LMF might support the entire UE coverage area, thereby making LMF 152 change unnecessary. In other environments, where an LMF change could be needed, the procedure in FIGS. 4B and 4C may be used instead.

At stage 1, stages 1-20 of FIG. 4A may be performed or steps 1-21 for the deferred 5GC-MT-LR procedure for periodic or triggered location events in 3GPP TS 23.273 clause 6.3.1 are performed with the following differences.

In step 1 of 3GPP TS 23.273 clause 6.3.1, the LCS Client or AF includes a request for user plane reporting in the Location Request and includes an IP address or FQDN for the user plane connection and security information to enable a secure connection.

In steps 4, 5 and 14 of 3GPP TS 23.273 clause 6.3.1, the request for user plane reporting and the IP address or FQDN and the security information are forwarded in sequence to the V-GMLC (if used), AMF and LMF. The criteria for sending cumulative event reports at step 14 are also conveyed to the LMF. The criteria can include a periodic time interval or the sending of a certain number of event reports via user plane at steps 7 and 11.

In step 16 of 3GPP TS 23.273 clause 6.3.1, the request for user plane reporting and an IP address or FQDN and security information for the LMF are sent to target UE. The LMF also retains the IP address or FQDN and security information for the LCS Client or AF that was received at step 14. The type of user plane connection (via the LMF) is also conveyed to the target UE at step 16.

In steps 17-21 of 3GPP TS 23.273 clause 6.3.1, the target UE indicates to the LMF, H-GMLC and LCS Client or AF whether event reporting via user plane can be supported by the target UE. If event reporting via user plane cannot be supported, the target UE uses the procedure in clause 6.3.1 of 3GPP TS 23.273 to send events reports via Control Plane.

At stage 2 of FIG. 4D, the UE 105 establishes a secure TCP/IP connection to the LMF 152 using the IP address or FQDN and security information received by the UE 105 at stage 1.

At stage 3, the LMF 152 establishes a secure TCP/IP connection to the LCS Client 130 or AF 132 using the IP address or FQDN and security information received by the LMF 152 at stage 1.

At stage 4, if the UE 105 needs assistance data to help obtain location measurements later at stage 6, the UE 105 performs stage 3 in FIG. 4B to obtain assistance data from the LMF 152 using control plane.

At stage 5, the UE 105 monitors for and detects the occurrence of a trigger or periodic event as described in stage 21 of FIG. 4A or for step 22 of the procedure in clause 6.3.1 of 3GPP TS 23.273.

At stage 6, the UE 105 obtains location measurements and possibly determines a location, and possibly using assistance data obtained at stage 4.

At stage 7, the UE 105 sends a supplementary services Event Report to the LMF 152 over the secure TCP/IP Connection established at stage 2. The event report indicates the type of event being reported and includes an embedded LPP message with the location measurements or location estimate obtained at stage 6.

At stage 8, the LMF 152 returns a supplementary services Event Report Acknowledgment to the UE 105 over the secure TCP/IP Connection established at stage 2.

At stage 9, if the LMF 152 needs additional location measurements or a location estimate from the UE 105, the LMF 152 exchanges LPP messages with the UE 105 over the secure TCP/IP Connection established at stage 2 to request and receive the additional location measurements or location estimate from the UE 105.

At stage 10, based on the location measurements or location estimate received from the UE 105 at stage 7 and/or stage 9, the LMF 152 determines or verifies a location estimate for the UE 105.

At stage 11, the LMF 152 sends a supplementary services, HTTP, or SUPL ULP Event Report to the LCS Client 130 or AF 132 over the secure TCP/IP Connection established at stage 3 and includes the type of event report and the location estimate determined or verified at stage 10.

At stage 12, the LCS Client 130 or AF 132 returns a supplementary services, HTTP, or SUPL ULP Event Report Acknowledgment to the LMF 152 over the secure TCP/IP Connection established at stage 3.

At stage 13, the UE 105 continues to monitor for and detect further trigger or periodic events as at stage 5 and repeats stages 6-12 for each detected trigger or periodic event.

At stage 14, based on the criteria received by the LMF 152 for sending of cumulative event reports (e.g. the expiration of a periodic timer or the sending of certain number of event reports), the LMF 152 sends a cumulative event report to the H-GMLC 155H and LCS Client 130 or AF 132 over the control plane portion of the periodic or triggered deferred 5GC-MT-LR using steps 28-30 of the procedure in clause 6.3.1 of 3GPP TS 23.273. The cumulative event report indicates to the H-GMLC 155H and External LCS Client 130 or AF 132 that the control plane portion of the periodic or triggered deferred 5GC-MT-LR is still operational, that the UE 105 is still reporting events (e.g. is still powered on and in network coverage) and may include statistics on the events reported since the last cumulative event report was sent (e.g. the number of event reports).

Cancellation of event reporting may be initiated by the UE 105, H-GMLC 155H or LCS Client 130 or AF 132 using the control plane procedures defined in clause 6.3.2 and 6.3.3 in 3GPP TS 23.273. A change to these procedures may be that the user plane connection(s) established for the procedures in FIGS. 4B, 4C, and 4D are also released. The user plane connection(s) may be released by either end once cancellation at the control plane level has occurred.

Figure 4E:
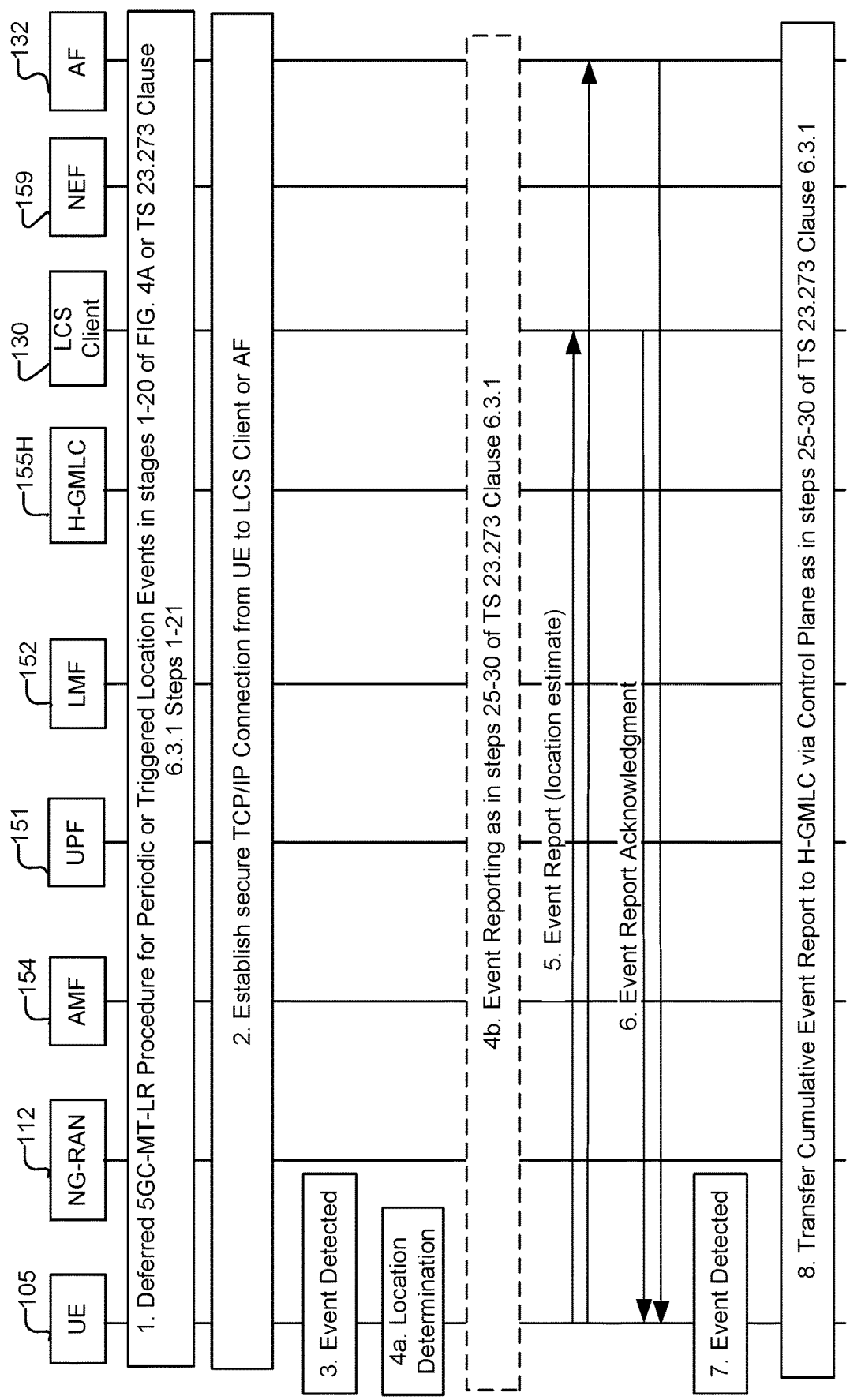
FIG. 4E shows a location reporting procedure which may be used by a UE to report to an LCS Client or AF via user plane.

FIG. 4E shows a procedure for event reporting from a UE 105 to an LCS Client 130 or AF 132 when a User Plane connection is established directly from the UE 105 to the LCS Client 130 or AF 132. This procedure is applicable when the target UE 105 is able to determine its location.

At stage 1, stages 1-20 of FIG. 4A or steps 1-21 in clause 6.3.1 of 3GPP TS 23.273 for the deferred 5GC-MT-LR procedure for periodic or triggered location are performed, with the following actions occurring at those stages for FIG. 4A, or the following additional actions occurring at those steps for clause 6.3.1 of 3GPP TS 23.273.

At stage 1 or step 1, the LCS Client 130 or AF 132 can include a request for user plane reporting in the LCS Service Request and may include a user plane address of the LCS Client 130 or AF 132 (e.g. which may be an IP address, a universal resource locator (URL), a Uniform Resource Identifier (URI) or a fully qualified domain name (FQDN)) and security information (e.g. a public security key of a private-public key pair and/or a private security key) to enable a secure connection. The H-GMLC 155H may verify that both the target UE 105 and the LCS Client 130 or AF 132 are subscribed to user plane reporting. If the LCS Client 130 or AF 132 did not include a user plane address or security information, the H-GMLC 155H may obtain a default user plane address and/or default security information from subscription data for the LCS Client 130 or AF 132. The H-GMLC 155H may determine criteria for sending cumulative events reports over control plane. The criteria can include a cumulative event report timer and/or a maximum number of user plane event reports counter.

At stages 4, 5 and 13 in FIG. 4A or steps 4, 5 and 14 of clause 6.3.1 of 3GPP TS 23.273, the request for user plane reporting, the user plane address, the security information and the criteria for sending cumulative events reports over control plane may be forwarded in sequence to a V-GMLC 155V (if used), serving AMF 154 and LMF 152.

At stage 14 in FIG. 4A or step 15 in clause 6.3.1 of 3GPP TS 23.273, the LMF 152 may verify that the UE 105 is able to support position methods that allow the UE 105 to determine its own location (e.g. UE based position methods).

At stage 15 in FIG. 4A or step 16 in clause 6.3.1 of 3GPP TS 23.273, the LMF 152 may include the request for user plane reporting, the user plane address, the security information and the criteria for sending cumulative events reports in the supplementary services LCS Periodic-Triggered Invoke Request sent to the target UE 105.

At stage 16 in FIG. 4A or step 17 in clause 6.3.1 of 3GPP TS 23.273, the target UE 105 may indicate to the LMF 152 whether event reporting via user plane can be supported by the target UE 105. If event reporting via user plane cannot be supported by the target UE 105, a failure response may be returned to the LCS Client 130 or AF 132 at stages 17-20 in FIG. 4A or steps 18-21 in clause 6.3.1 of 3GPP TS 23.273.

Returning to the procedure in FIG. 4E, at stage 2, the UE 105 may establish a secure user plane connection to the LCS Client 130 or AF 132 using the user plane address and the security information received at stage 1. The secure user plane connection and its protocols may be as described for FIG. 3A or FIG. 3B and may not pass through the LMF 152 or HGMLC 155H.

At stage 3, the UE 105 may monitor for and detect the occurrence of a trigger or periodic event as described for stage 21 of the procedure in FIG. 4A or step 22 in clause 6.3.1 of 3GPP TS 23.273.

At stage 4a, the UE 105 may obtain location measurements and determine a current location of the UE 105.

At stage 4b, if the UE 105 is unable to determine its location at stage 4a, the UE 105 may send an event report without a location estimate to the LCS Client 130 or AF 132 over the secure user plane connection established at stage 2 or over the control plane as described for steps 24-30 in clause 6.3.1 of 3GPP TS 23.273.

At stage 5, if the UE 105 was able to determine its location at stage 4a, the UE 105 may send an Event Report to the LCS Client 130 or AF 132 over the secure user plane connection established at stage 2. The Event Report may indicate the type of event being reported (e.g. a periodic event, an area related event or a motion related event) and may include the location determined at stage 4a and possibly a time or timestamp of the event detection at step 3 or the location determination at step 4a.

At stage 6, the LCS Client 130 or AF 132 may return an Event Report Acknowledgment to the UE 105 over the secure user plane connection established at stage 2.

It can be noted that the event report and event report acknowledgment may reuse existing supplementary services messages as defined in 3GPP TS 24.080 or may use messages for HTTP or SUPL ULP as described for FIGS. 3A and 3B.

At stage 7, the UE 105 may continue to monitor for and detect further trigger or periodic events as at stage 3 and may repeat stages 4-6 for each detected trigger or periodic event.

At stage 8, the UE 105 may monitor the criteria received at stage 1 for sending of cumulative event reports. If a cumulative event report timer was received at stage 1, the UE 105 may start the timer following stage 1 and after each cumulative event report is sent. If a maximum number of user plane event reports counter was received at stage 1, the UE 105 may maintain a count of the number of user plane event reports sent at stage 5. When the cumulative event report timer expires or when the count of user plane events reports sent at stage 5 reaches the maximum number of user plane event reports counter, the UE 105 may send a cumulative event report and restarts the timer and the count of user plane event reports. The UE 105 sends the cumulative event report to the LMF 152, H-GMLC 155H and LCS Client 130 or AF 132 over the control plane portion of the periodic or triggered deferred 5GC-MT-LR, e.g. using steps 24-30 in clause 6.3.1 of 3GPP TS 23.273. The cumulative event report may indicate to the LMF 152, H-GMLC 155H and External LCS Client 130 or AF 132 that the control plane portion of the periodic or triggered deferred 5GC-MT-LR is still active, that the UE 105 is reporting events via user plane and may include statistics on the events reported since the last cumulative event report was sent (e.g. the number of event reports sent). The cumulative event report may be an event report message as defined in 3GPP TS 24.080 that also indicates a type of event that is a "cumulative event report" type of event.

A target UE 105 may also send a cumulative event report at stage 8 to obtain assistance data from the LMF 152 to assist with location at stage 4a. In this case, the target UE 105 may include a positioning LPP request for assistance data (e.g. as defined in 3GPP TS 37.355) in the cumulative event report sent to the LMF 152 at step 25 of 3GPP TS 23.273 and the LMF 152 may use step 27 of clause 6.3.1 of 3GPP TS 23.273 to return the requested assistance data to the target UE 105. In this case, the cumulative event report timer and the count of user plane event reports may be restarted and a cumulative event report may be sent on to the H-GMLC 155H and LCS Client 130 or AF 132 by the LMF 152 (but without the embedded positioning LPP request for assistance data).

During the event reporting shown in FIG. 4E, the current LMF 152 used for event reporting via control plane for the UE 105 may need to be replaced by another new LMF 152—e.g. if the location (e.g. a tracking area) of the UE 105 changes and is no longer in a service area for the current LMF 152 but is in a service area for the other new LMF 152. In that case, when the UE 105 sends a cumulative event report at stage 8, the serving AMF 154 or the current LMF 152 may detect that the UE 105 is no longer in the service area for the current LMF 152 (e.g. is not in a tracking area supported by the current LMF 152) and may then invoke the LMF change procedure in clause 6.4 of 3GPP TS 23.273 to forward the cumulative event report (and any request for assistance data) to the other new LMF 152. In this case, the new LMF 152 can return any assistance data to the UE 105 (if this was requested) and can forward the cumulative event report to the H-GMLC 155H and LCS Client 130 or AF 132.

It can be noted that when using stage 8 to request assistance data, the UE 105 may perform stage 8 well before performing stage 4a for a user plane event report in order to avoid extra delay in sending the user plane event report.

Figure 5:
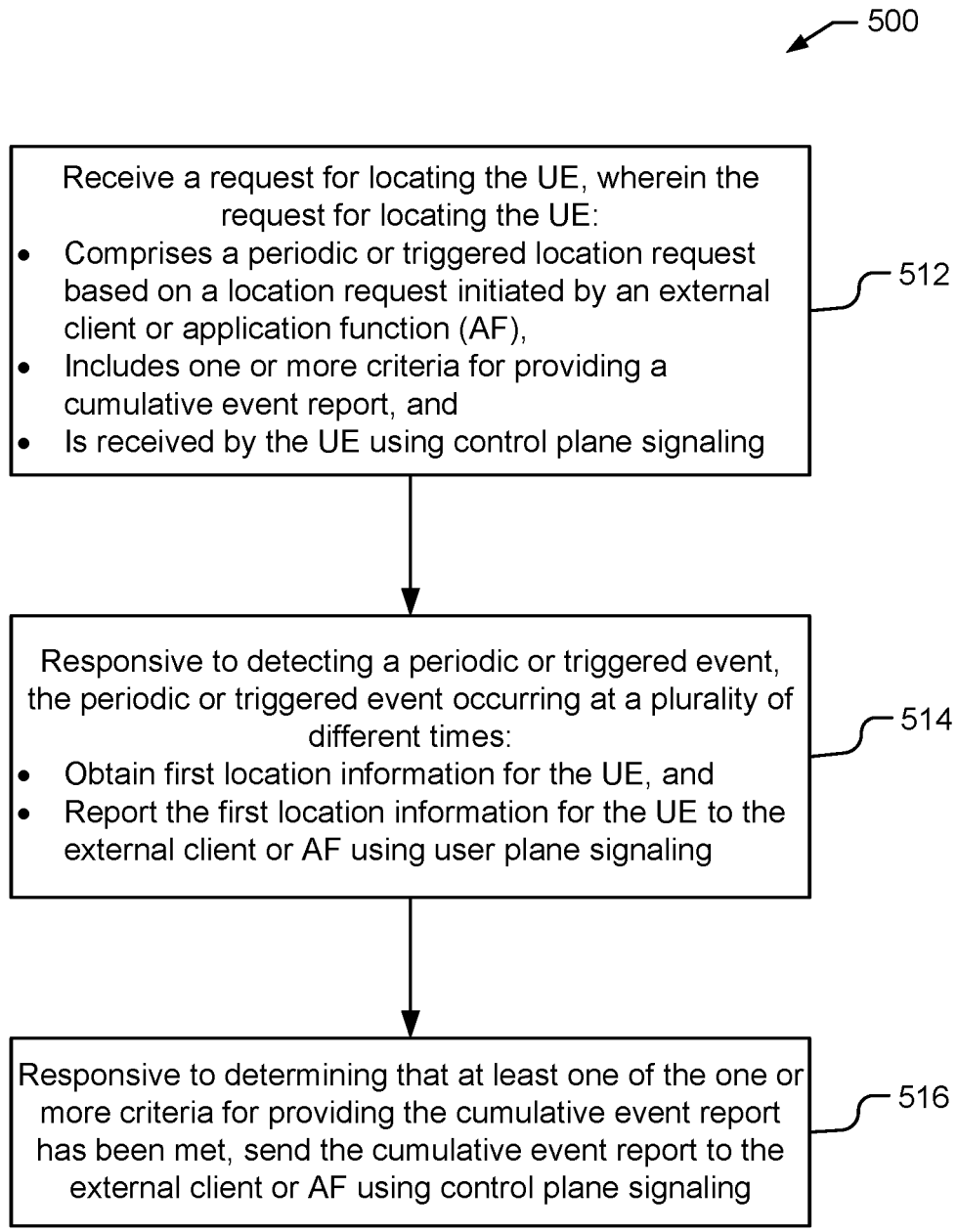
FIG. 5 is an illustration of a process flow illustrating a method for locating a user equipment (UE) performed by the UE in a wireless network, according to an embodiment.

FIG. 5 is an illustration of a process flow 500 illustrating a method for locating a user equipment (UE), such as the target UE 105, performed by the UE in a wireless network, according to some embodiments. The UE, for example, may be the UE 105 or the UE 800 shown in FIG. 8.

At block 512, the functionality comprises receiving a request for locating the UE, where the request for locating the UE: comprises a periodic or triggered location request based on a location request initiated by an external client or application function (AF); includes one or more criteria for providing a cumulative event report; and is received by the UE using control plane signaling e.g., as described at stage 1 of FIG. 4E and stages 1-15 of FIG. 4A. The request may come from, or via, an LMF (e.g. the LMF 152), for example. A means and/or structure for performing this functionality may comprise, e.g., the wireless transceiver 802 and one or more processors 804 with dedicated hardware or implementing executable code or software instructions in memory 820 such as the location request receive unit 822 in the UE 800 illustrated in FIG. 8.

At block 514, the functionality comprises, responsive to detecting a periodic or triggered event (e.g., as at stage 3 of FIG. 4E), the periodic or triggered event occurring at a plurality of different times: obtaining first location information for the UE (e.g., as at stage 4a of FIG. 4E), and reporting the first location information for the UE to the external client or AF using user plane signaling (e.g., as at stage 5 of FIG. 4E). A means and/or structure for performing this functionality may comprise, e.g., the wireless transceiver 802 and one or more processors 804 with dedicated hardware or implementing executable code or software instructions in memory 820 such as the location information obtain unit 828 in the UE 800 illustrated in FIG. 8.

At block 516, the functionality comprises, responsive to determining that at least one of the one or more criteria for providing the cumulative event report has been met (e.g., as at stage 8 of FIG. 4E), sending the cumulative event report to the external client or AF using control plane signaling (e.g., as at stage 8 of FIG. 4E). A means and/or structure for performing this functionality may comprise, e.g., the wireless transceiver 802 and one or more processors 804 with dedicated hardware or implementing executable code or software instructions in memory 820 such as the location information obtain unit 828 in the UE 800 illustrated in FIG. 8.

In one implementation, reporting the first location information for the UE to the external client or AF using user plane signaling comprises reporting the first location information for the UE (1) to the external client or AF directly, or (2) via a location management function (LMF) or Home Gateway Mobile Location Center (H-GMLC) or both, e.g., as described at stages 7 and 8 of FIG. 4C and stages 7 and 11 of FIG. 4D. As discussed herein, according to some embodiments, reporting the first location information for the UE to the external client or AF directly may comprise sending an event report message to the external client or AF using user plane signaling, with the first location information included in the event report message, e.g. as described for stage 5 of FIG. 4E. In such embodiments, the event report message may comprise an HTTP message or a SUPL ULP message.

In one implementation, reporting the first location information for the UE to the external client or AF via the LMF comprises sending a first event report message using user plane signaling to the LMF, with the first location information included in the first event report message, e.g. as described at stage 7 in FIG. 4D. In some embodiments the first event report message may comprise a supplementary services message. According to some embodiments, reporting the first location information for the UE to the external client or AF via the LMF may further comprise exchanging Long Term Evolution (LTE) Positioning Protocol (LPP) messages with the LMF using user plane signaling either after or when reporting the first location information to provide positioning measurements to the LMF to enable the UE or the LMF to determine a location estimate for the UE (e.g. using a UE based or a UE assisted position method), e.g. as described at stages 9 and 10 of FIG. 4D. The LMF may then send a second event report message comprising the location estimate to the external client or AF using user plane signaling, e.g. as described at stage 11 of FIG. 4D.

In one implementation, reporting the first location information for the UE to the external client or AF via the H-GMLC may comprise sending a first event report message with the first location information using user plane signaling to the H-GMLC, e.g. as described at stage 7 for FIG. 4C. The H-GMLC may then send a second event report message comprising the location estimate to the external client or AF using user plane signaling, e.g. as described at stage 8 for FIG. 4C. In some embodiments, the first event report message may comprise a supplementary services message, an HTTP message, or a SUPL ULP message.

In one implementation, the request for locating the UE includes at least one of: an indication of using user plane signaling to report the first location information, a type of user plane connection, and an address to which the first location information is to be reported, e.g., as described herein with respect to stage 1 of FIG. 4E and stage 15 of FIG. 4A. In such an implementation, the UE may establish a first user plane connection to at least one of the external client or AF or to another entity based on the address, where the other entity establishes a second user plane connection towards the external client or AF, and where the first location information is reported using either the first user plane connection or the first and second user plane connections. The first and second user plane connections each may be based on at least one of: an Internet Protocol (IP) or a Transmission Control Protocol (TCP), or both, e.g. as described for FIGS. 3A and 3B. The first user plane connection the second user plane connection, or both, may be secure and established based on received security information. Some embodiments may further comprise sending or receiving, using control plane signaling, a cancellation of locating the UE, where the first user plane connection is released after cancellation of a control plane connection.

In one implementation, obtaining the first location information for the UE comprises: sending a request for assistance data to a location server using control plane signaling; and receiving assistance data from the location server using control plane signaling, e.g., as described herein with respect to stage 4 of FIG. 4D. Additionally or alternatively, sending the cumulative event report (e.g., as at stage 8 of FIG. 4E) may comprise sending the cumulative event report to the external client or AF, a location server, a Home Gateway Mobile Location Center (H-GMLC), or some combination thereof, e.g. as described for stage 8 of FIG. 4E.

Figure 6:
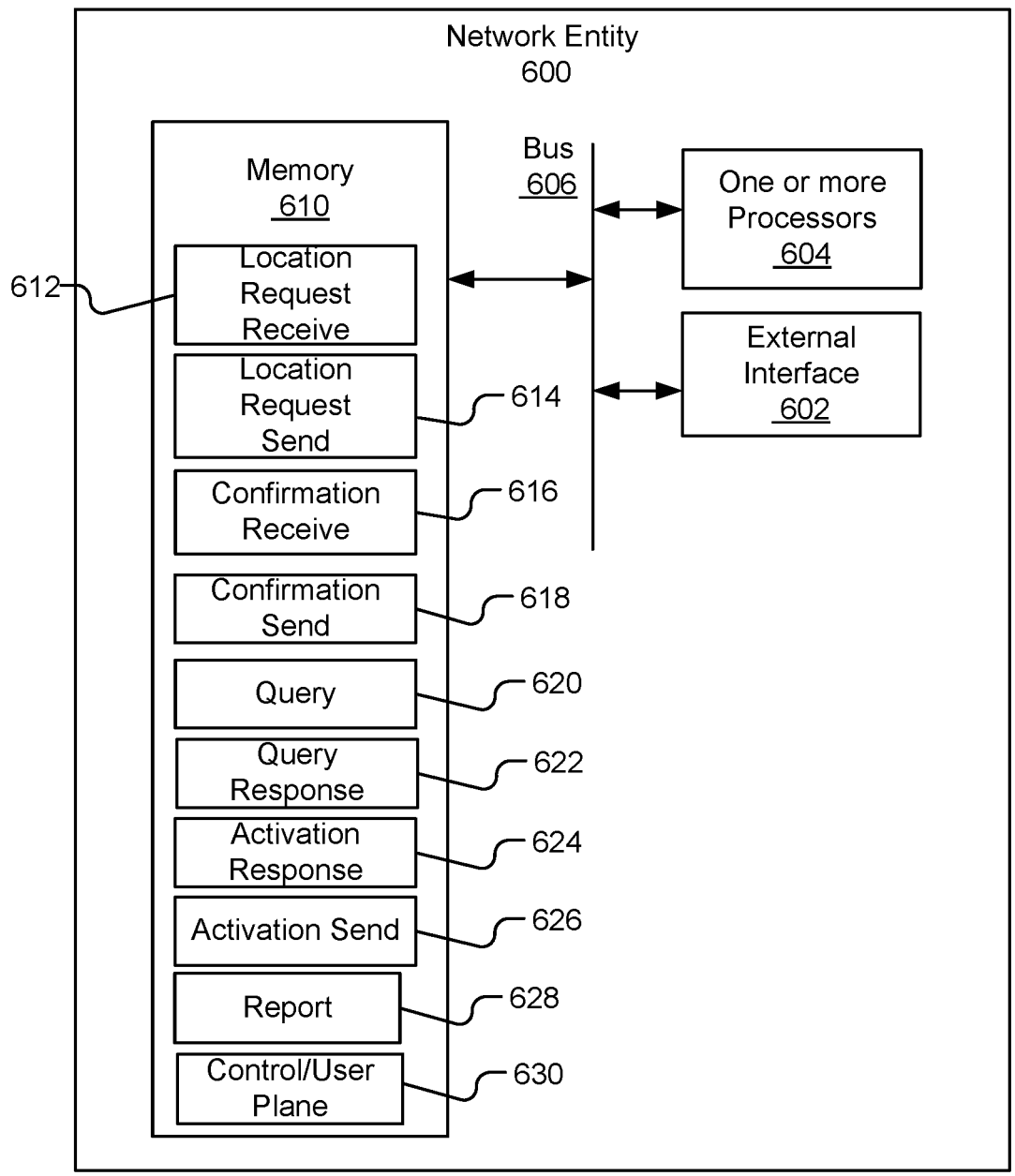
FIG. 6 is a block diagram of an embodiment of a network entity, such as a GMLC or NEF, that supports a VLLLS.

FIG. 6 is a diagram illustrating an example of a hardware implementation of a network entity 600, such as GMLC 155, VGMLC 155V, HGMLC 155H or NEF 159 as shown in FIGS. 1A, 1B, and 2. The network entity 600 may be, e.g., part of a wireless network such as a 5G Core network (5GCN) 150, 150V, or 150H. The network entity 600 includes, e.g., hardware components such as an external interface 602, which may be a wired or wireless interface capable of connecting to an external client 130, NEF 159 (if network entity 600 is GMLC 155), GMLC 155 (if network entity 600 is NEF 159 or another GMLC 155), UDM 156, AMF 154. The network entity 600 includes one or more processors 604 and memory 610, which may be coupled together with bus 606. The memory 610 may contain executable code or software instructions that when executed by the one or more processors 604 cause the one or more processors to operate as a special purpose computer programmed to perform the procedures and techniques disclosed herein.

As illustrated in FIG. 6, the memory 610 includes one or more components or modules that when implemented by the one or more processors 604 implements the methodologies as described herein. While the components or modules are illustrated as software in memory 610 that is executable by the one or more processors 604, it should be understood that the components or modules may be dedicated hardware either in the processors 604 or off processor. As illustrated, the memory 610 may include a location request receive unit 612 that enables the one or more processors 604 to receive via the external interface 602 and process a request for locating the UE from an external client. The memory 610 may include a location request send unit 616 that enables the one or more processors 604 to transfer via the external interface 602 the request for locating the UE to another entity in the wireless network, such as AMF 154, using control plane signaling, wherein the request for locating the UE includes a request to report the location information using user plane signaling (or control plane signaling) and an address to which the location information is to be reported. The memory 610 may include a confirmation receive unit 616 that enables the one or more processors 604 to receive via the external interface 602 and process a response from the other entity using control plane signaling, wherein the response indicates acceptance of the request for locating the UE. A confirmation send unit 618 enables the one or more processors 604 to send via the external interface 602 the response to the external client. The memory 610 may further include a query unit 620 that enables the one or more processors 604 to query via the external interface 602 another entity, e.g., UDM 156, in the wireless network for an address of the other entity. The memory 610 may further include a query response unit 622 that enables the one or more processors 604 to receive via the external interface 602 a response to the query from another entity, e.g., UDM 156, in the wireless network with the address of the other entity. The memory 610 may further include an activation response unit 624 that enables the one or more processors 604 to receive, via the external interface 602, a second response from the second entity using control plane signaling, wherein the second response indicates activation of the request for locating the UE in a Radio Access Network (RAN), wherein the RAN provide wireless access to the UE. The memory 610 may further include an activation send unit 626 that enables the one or more processors 604 to forward, via the external interface 602, the second response to the external client.

The one or more processors 604 may be configured by the report unit 628 to receive a report, such as an event report, with location information from the UE or the LMF, via the external interface 602, using user plane signaling. The one or more processors 604 may be further configured by the report unit 628 to send a report, such as an event report, with location information to an external client or an AF, via the external interface 602, using user plane signaling. The one or more processors 604 may be further configured by the report unit 628 to receive a periodic or triggered cumulative event report to an external client, AF, or GMLC using control plane signaling, via the external interface 602, that indicates that the periodic or triggered location request remains operational, that the UE is still reporting events (e.g. is still powered on and in network coverage) and may include statistics on the events reported since the last cumulative event report was sent (e.g. the number of event reports).

The one or more processors 604 may be configured by a control/user plane unit 630 to establish and cancel user plane connections and control plane connections. The one or more processors 604 may be configured by a control/user plane unit 630 to establish user plane connections, e.g., using IP, TCP, or both, and to establish a secure user plane connection based on security information, such as a private authentication key or token.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 610, and are configured to cause the one or more processors 604 to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A first entity in a wireless network, such as network entity 600, configured to support location determination of a user equipment (UE) may include a means for receiving a request for locating the UE from an external client, which may be, e.g., the external interface 602 and one or more processors 604 with dedicated hardware or implementing executable code or software instructions in memory 610 such as the location request receive unit 612. A means for transferring the request for locating the UE to a second entity in the wireless network using control plane signaling, wherein the request for locating the UE includes a request to report the location information using user plane signaling and an address to which the location information is to be reported may be, e.g., the external interface 602 and one or more processors 604 with dedicated hardware or implementing executable code or software instructions in memory 610 such as the location request send unit 614. A means for receiving a first response from the second entity using control plane signaling, wherein the first response indicates acceptance of the request for locating the UE may be, e.g., the external interface 602 and one or more processors 604 with dedicated hardware or implementing executable code or software instructions in memory 610 such as the confirmation receive unit 616. A means for forwarding the first response to the external client may be, e.g., the external interface 602 and one or more processors 604 with dedicated hardware or implementing executable code or software instructions in memory 610 such as the confirmation send unit 618.

In one implementation, the first entity may include a means for sending a query to a third entity for an address of the second entity prior to transferring the request for locating the UE to the second entity, which may be, e.g., the external interface 602 and one or more processors 604 with dedicated hardware or implementing executable code or software instructions in memory 610 such as the query unit 620. A means for receiving from the third entity the address of the second entity may be, e.g., the external interface 602 and one or more processors 604 with dedicated hardware or implementing executable code or software instructions in memory 610 such as the query response unit 622.

In one implementation, the first entity may include a means for receiving a second response from the second entity using control plane signaling, wherein the second response indicates activation of the request for locating the UE in a Radio Access Network (RAN), wherein the RAN provide wireless access to the UE, which may be, e.g., the external interface 602 and one or more processors 604 with dedicated hardware or implementing executable code or software instructions in memory 610 such as the activation response unit 624. A means for forwarding the second response to the external client may be, e.g., the external interface 602 and one or more processors 604 with dedicated hardware or implementing executable code or software instructions in memory 610 such as the activation send unit 626.

Figure 7:
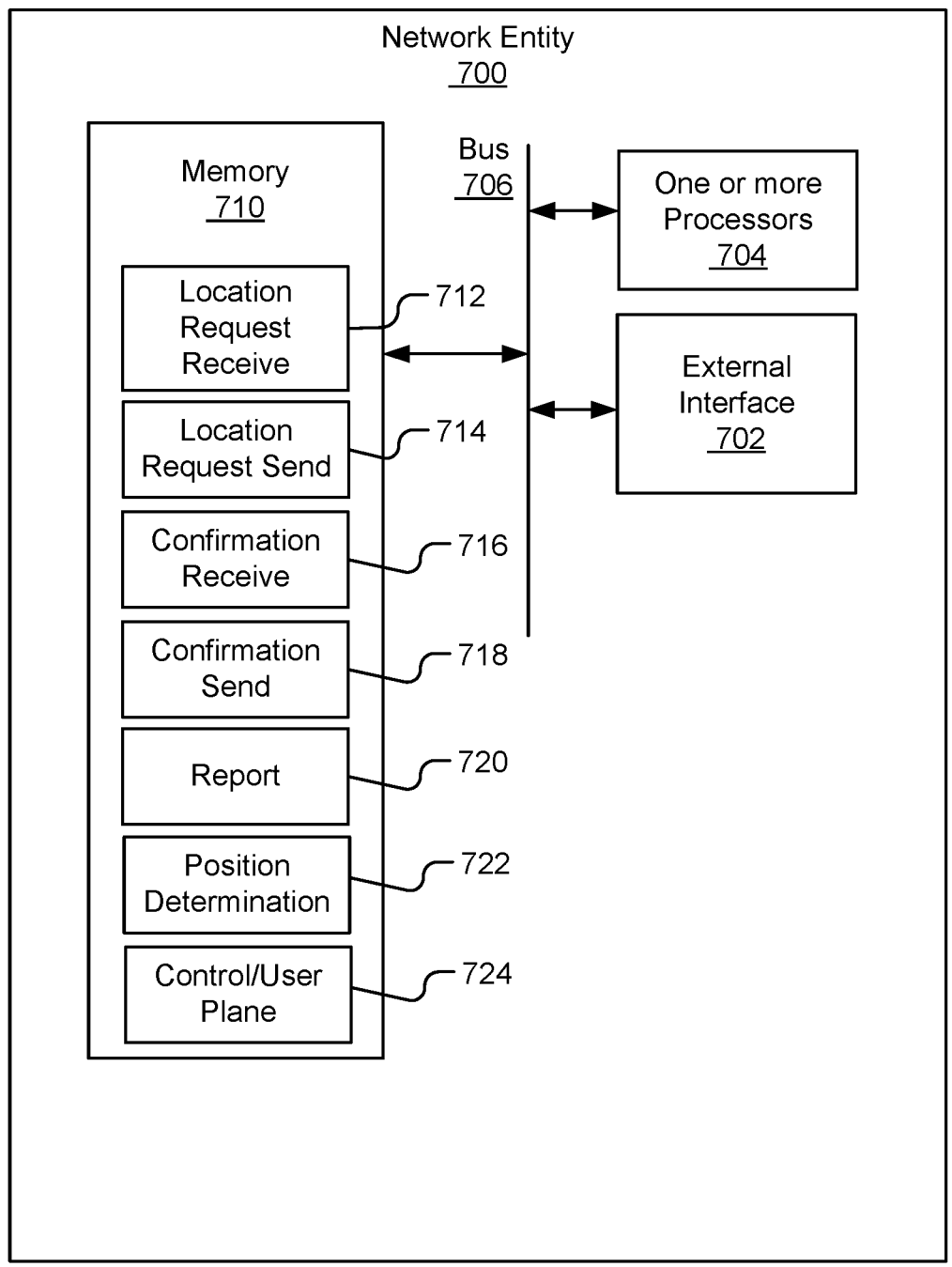
FIG. 7 is a block diagram of an embodiment of a network entity, such as an AMF or LMF, that supports a VLLLS.

FIG. 7 is a diagram illustrating an example of a hardware implementation of a network entity 700, such as AMF 154 or LMF 152 shown in FIGS. 1A, 1B, and 2. The network entity 700 may be, e.g., part of a wireless network such as a 5G Core network (5GCN) 150, 150V, or 150H. The network entity 700 includes, e.g., hardware components such as an external interface 702, which may be a wired or wireless interface capable of connecting to GMLC 155, NEF 159, LMF 152 (if the network entity 700 is AMF 154), AMF 154 (if the network entity is LMF 152), UDM 156, and serving base station 110-1. The network entity 700 includes one or more processors 704 and memory 710, which may be coupled together with bus 706. The memory 710 may contain executable code or software instructions that when executed by the one or more processors 704 cause the one or more processors to operate as a special purpose computer programmed to perform the procedures and techniques disclosed herein.

As illustrated in FIG. 7, the memory 710 includes one or more components or modules that when implemented by the one or more processors 704 implements the methodologies as described herein. While the components or modules are illustrated as software in memory 710 that is executable by the one or more processors 704, it should be understood that the components or modules may be dedicated hardware either in the processors 704 or off processor. As illustrated, the memory 710 may include a location request receive unit 712 that enables the one or more processors 704 to receive via the external interface 702 and process a request for locating the UE from a second entity in the wireless network, such as the GMLC 155 or NEF 159, wherein the request for locating the UE is based on a location request initiated by an external client and is received using control plane signaling. The memory 710 may include a location request send unit 716 that enables the one or more processors 704 to send via the external interface 702 information for the request for locating the UE to a third entity in the wireless network using control plane signaling, where the third entity may be a serving base station, e.g., gNB 110-1 or UE 105, wherein the request for locating the UE and the information for the request for locating the UE each include a request to report location information using user plane signaling and an address to which the location information is to be reported, wherein the information for the request for locating the UE enables the third entity to obtain location information for the UE using control plane signaling and report the location information for the UE to the external client using user plane signaling. The memory 710 may include a confirmation receive unit 716 that enables the one or more processors 704 to receive via the external interface 702 and process a response from the third entity using control plane signaling, wherein the response indicates an activation or a confirmation of the request for locating the UE in the third entity. A confirmation send unit 718 enables the one or more processors 704 to send via the external interface 702 the response to the second entity.

The one or more processors 704 may be configured by the report unit 720 to receive a report, such as an event report, with location information from the UE, via the external interface 702, using user plane signaling. The one or more processors 704 may be further configured by the report unit 720 to send a report, such as an event report, with location information to a GMLC, an external client, or an AF, via the external interface 702, using user plane signaling. The one or more processors 704 may be further configured by the report unit 720 to send a periodic or triggered cumulative event report to an external client, AF, or GMLC using control plane signaling, via the external interface 702, that indicates that the periodic or triggered location request remains operational, that the UE is still reporting events (e.g. is still powered on and in network coverage) and may include statistics on the events reported since the last cumulative event report was sent (e.g. the number of event reports).

The one or more processors 704 may be configured by the position determination unit 722 to determine or verify a location estimate for a UE based on location information received from the UE and from gNBs, e.g., using UE assisted based positioning methods as discussed herein. The one or more processors 704 may be configured by the position determination unit 722 to exchange LPP messages with the UE, e.g., using user plane signaling, to obtain positioning measurements and optionally to provide assistance data. The one or more processors 704 may be configured by the position determination unit 722 to receive a request for assistance data from the UE and to send assistance data to the UE using control plane signaling or user plane signaling.

The one or more processors 704 may be configured by a control/user plane unit 724 to establish and cancel user plane connections and control plane connections. The one or more processors 704 may be configured by a control/user plane unit 724 to establish user plane connections, e.g., using IP, TCP, or both, and to establish a secure user plane connection based on security information, such as a private authentication key or token.

The methodologies described herein may be implemented by various means depending upon the application. For example, these methodologies may be implemented in hardware, firmware, software, or any combination thereof. For a hardware implementation, the one or more processors 704 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the one or more processor units to operate as a special purpose computer programmed to perform the techniques disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium such as memory 710. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 710, and are configured to cause the one or more processors 704 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A first entity in a wireless network, such as the network entity 700, configured to support location determination of a user equipment (UE) may include a means for receiving a request for locating the UE from a second entity in the wireless network, wherein the request for locating the UE is based on a location request initiated by an external client and is received by the first entity from the second entity using control plane signaling, which may be, e.g., the external interface 702 and one or more processors 704 with dedicated hardware or implementing executable code or software instructions in memory 710 such as the location request receive unit 712. A means for sending information for the request for locating the UE to a third entity in the wireless network using control plane signaling, wherein the request for locating the UE and the information for the request for locating the UE each include a request to report location information using user plane signaling and an address to which the location information is to be reported, wherein the information for the request for locating the UE enables the third entity to obtain location information for the UE using control plane signaling and report the location information for the UE to the external client using user plane signaling may be, e.g., the external interface 702 and one or more processors 704 with dedicated hardware or implementing executable code or software instructions in memory 710 such as the location request send unit 714.

In one implementation, the first entity may include a means for receiving a response from the third entity using control plane signaling, wherein the response indicates an activation or a confirmation of the request for locating the UE in the third entity, which may be, e.g., the external interface 702 and one or more processors 704 with dedicated hardware or implementing executable code or software instructions in memory 710 such as the confirmation receive unit 716. A means for forwarding the response to the second entity may be, e.g., the external interface 702 and one or more processors 704 with dedicated hardware or implementing executable code or software instructions in memory 710 such as the confirmation send unit 718.

Figure 8:
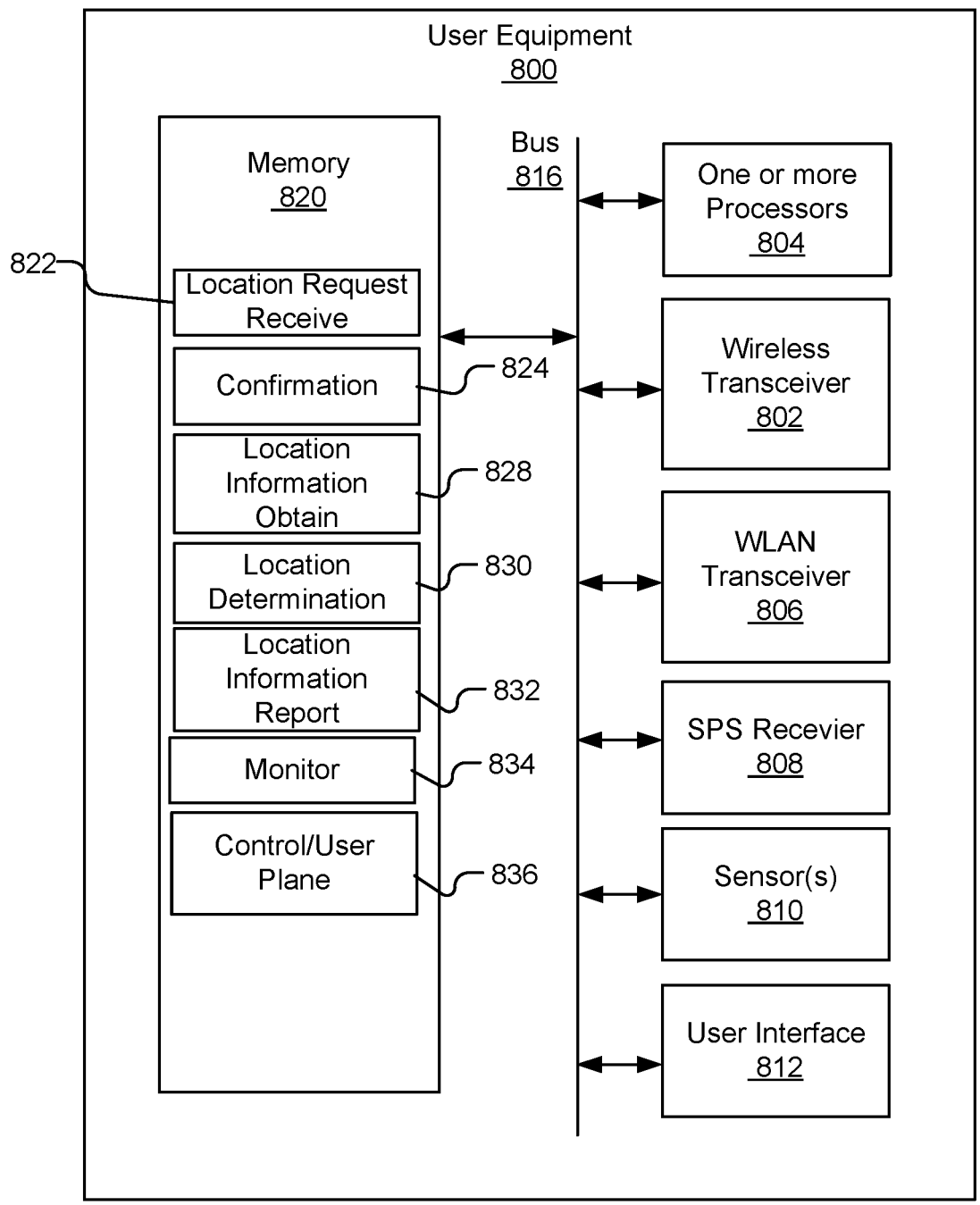
FIG. 8 is a block diagram of an embodiment of a user equipment that supports a VLLLS.

FIG. 8 is a diagram illustrating an example of a hardware implementation of a UE 800, such as UE 105 shown in FIGS. 1A, 1B, and 2. The UE 800 may include an external interface, such as a wireless transceiver 802 to wirelessly communicate with a base station in a Radio Access Network, such as a gNB 110-1. The UE 800 may also communicate using the wireless transceiver 802 with elements in a 5GCN, such as an AMF 154 or LMF 152, as discussed herein, and shown in FIG. 4A. The UE 800 may also include additional transceivers, such a wireless local area network (WLAN) transceiver 806, as well as an SPS receiver 808 for receiving and measuring signals from SPS SVs 190 (shown in FIGS. 1A, 1B, and 2). The UE 800 may further include one or more sensors 810, such as cameras, accelerometers, gyroscopes, electronic compass, magnetometer, barometer, etc. The UE 800 may further include a user interface 812 that may include e.g., a display, a keypad or other input device, such as virtual keypad on the display, through which a user may interface with the UE 800. The UE 800 further includes one or more processors 804 and memory 820, which may be coupled together with bus 816. The one or more processors 804 and other components of the UE 800 may similarly be coupled together with bus 816, a separate bus, or may be directly connected together or coupled using a combination of the foregoing. The memory 820 may contain executable code or software instructions that when executed by the one or more processors 804 cause the one or more processors to operate as a special purpose computer programmed to perform the algorithms disclosed herein.

As illustrated in FIG. 8, the memory 820 may include one or more components or modules that may be implemented by the one or more processors 804 to perform the methodologies described herein. While the components or modules are illustrated as software in memory 820 that is executable by the one or more processors 804, it should be understood that the components or modules may be dedicated hardware either in the one or more processors 804 or off the processors. As illustrated, the memory 820 may include a location request receive unit 822 that enables the one or more processors 804 to receive via the wireless transceiver 802 a request for locating the UE from an entity in the wireless network, such as the AMF 154, the LMF 152, an gNB 110-1, or an gNB 110-2, wherein the request for locating the UE is based on a location request initiated by an external client and is received using control plane signaling.

The memory 820 may further include a confirmation unit 824 that enables the one or more processors 804 to return via the wireless transceiver 802 a confirmation of the request for locating the UE to the second entity using control plane signaling.

The memory 820 may further include a location information obtain unit 828 that enables the one or more processors 804 to receive via the wireless transceiver 802 location information for the UE using control plane signaling.

In some implementations, the memory 820 may further include a location determination unit 830 that enables the one or more processors 804 to determine a location estimate of the UE using the obtained measurements, where the location estimate may be the received location information.

The memory 820 may further include a location information report unit 832 that enables the one or more processors 804 to send via the wireless transceiver 802 the location information for the UE to an external client using user plane signaling, which may be based on at least one of the Internet Protocol (IP), the Transmission Control Protocol (TCP), Transport Layer Security (TLS), or some combination of these. In some implementations, the location information report unit 832 may report the location information using user plane signaling. For example, the first location information may be reported using a Protocol Data Unit (PDU) session for the UE. The one or more processors 804 may be configured by the location information report unit 832 to send, via the wireless transceiver 802, an event report that includes location information, including location measurements and/or location estimate, directly to an external client or AF or via an LMF or GMLC or both the LMF and GMLC using user plane signaling. The one or more processors 804 may be further configured by the location information report unit 832 to send, via the wireless transceiver 802, a periodic or triggered cumulative event report to an external client, AF, LMF, or GMLC using control plane signaling, that indicates that the periodic or triggered location request remains operational, that the UE is still reporting events (e.g. is still powered on and in network coverage) and may include statistics on the events reported since the last cumulative event report was sent (e.g. the number of event reports).

The memory 820 may further include a monitor unit 834 that enables the one or more processors 804 to monitor for an occurrence of one or more times, which may be, e.g., periodic times or times for trigger events, wherein location measurements are obtained, e.g., using location information obtain unit 828 at each of the times for at least one of signals received from a plurality of transmission points (TPs), signals received from entities outside the 5GS, or inertial sensors of the UE; at least some of the first location information is determined, e.g., by location determination unit 830, at each of the times based on the location measurements obtained at each of the first times; and the at least some of the first location information is sent to the external client, e.g., using location information report unit 832, following each of the times using the user plane signaling. The one or more processors 804 may be configured by the location information unit 828 to exchange LPP messages with an LMF to obtain and report positioning measurements, including requesting and receiving assistance data, e.g., using user plane signaling or control plane signaling.

The one or more processors 804 may be configured by a control/user plane unit 836 to establish and cancel user plane connections and control plane connections. The one or more processors 804 may be configured by a control/user plane unit 836 to establish user plane connections, e.g., using IP, TCP, or both, and to establish a secure user plane connection based on security information, such as a private authentication key or token.

The methodologies described herein may be implemented by various means depending upon the application. For example, these methodologies may be implemented in hardware, firmware, software, or any combination thereof. For a hardware implementation, the one or more processors 804 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 800 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 820) and executed by one or more processors 804, causing the one or more processors 804 to operate as a special purpose computer programmed to perform the techniques disclosed herein. Memory may be implemented within the one or processors 804 or external to the one or more processors 804. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 800 may be stored as one or more instructions or code on a non-transitory computer-readable storage medium such as memory 820. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 800 may be provided as signals on transmission media included in a communication apparatus. For example, a communication apparatus comprising part or all of UE 800 may include a transceiver having signals indicative of instructions and data. The instructions and data are stored on non-transitory computer readable media, e.g., memory 820, and are configured to cause the one or more processors 804 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A first entity in a wireless network, such as user equipment (UE) 800, configured to support location determination of the UE may include a means for receiving a request for locating the UE from a second entity in the wireless network, wherein the request for locating the UE is based on a location request initiated by an external client and is received by the first entity from the second entity using control plane signaling, which may be, e.g., the wireless transceiver 802 and one or more processors 804 with dedicated hardware or implementing executable code or software instructions in memory 820 such as the location request receive unit 822. A means for obtaining first location information for the UE using control plane signaling, may be, e.g., the wireless transceiver 802 and one or more processors 804 with dedicated hardware or implementing executable code or software instructions in memory 820 such as the location information obtain unit 828. A means reporting the first location information for the UE to the external client using user plane signaling, which may be, e.g., the wireless transceiver 802 and one or more processors 804 with dedicated hardware or implementing executable code or software instructions in memory 820 such as the location information report unit 832.

In one implementation, the first entity may include a means for returning a confirmation of the request for locating the UE to the second entity using control plane signaling, which may be, e.g., the wireless transceiver 802 and one or more processors 804 with dedicated hardware or implementing executable code or software instructions in memory 820 such as the confirmation unit 824.

In one implementation, the first entity may include a means for monitoring for an occurrence of each of the first times, which may be, e.g., the wireless transceiver 802 and one or more processors 804 with dedicated hardware or implementing executable code or software instructions in memory 820 such as the monitor unit 834. A means for obtaining location measurements at each of the first times for at least one of signals received from a plurality of transmission points (TPs), signals received from entities outside the 5GS, or inertial sensors of the UE may be, e.g., the wireless transceiver 802 and one or more processors 804 with dedicated hardware or implementing executable code or software instructions in memory 820 such as the location information obtain unit 828. A means for determining at least some of the first location information at each of the first times based on the location measurements obtained at each of the first times may be, e.g., the wireless transceiver 802 and one or more processors 804 with dedicated hardware or implementing executable code or software instructions in memory 820 such as the location determination unit 830. A means for sending the at least some of the first location information to the external client following each of the first times using the user plane signaling may be, e.g., the wireless transceiver 802 and one or more processors 804 with dedicated hardware or implementing executable code or software instructions in memory 820 such as the location information report unit 832.

One implementation, may be described as follows:

Clause 1: A method performed by a user equipment (UE) for locating the UE in a wireless network, the method comprising: receiving a request for locating the UE, wherein the request for locating the UE: comprises a periodic or triggered location request based on a location request initiated by an external client or application function (AF), includes one or more criteria for providing a cumulative event report, and is received by the UE using control plane signaling; responsive to detecting a periodic or triggered event, the periodic or triggered event occurring at a plurality of different times: obtaining first location information for the UE, and reporting the first location information for the UE to the external client or AF using user plane signaling; and responsive to determining that at least one of the one or more criteria for providing the cumulative event report has been met, sending the cumulative event report to the external client or AF using control plane signaling.

Clause 2: The method of clause 1, wherein reporting the first location information for the UE to the external client or AF using user plane signaling comprises reporting the first location information for the UE (1) to the external client or AF directly, or (2) via a location management function (LMF) or Home Gateway Mobile Location Center (H-GMLC) or both.

Clause 3: The method of clause 2 wherein reporting the first location information for the UE to the external client or AF directly comprises sending an event report message to the external client or AF using user plane signaling, with the first location information included in the event report message.

Clause 4: The method of any one of clauses 2-3 wherein the event report message comprises a supplementary services message, an HTTP message, or a SUPL ULP message.

Clause 5: The method of clause 2 wherein reporting the first location information for the UE to the external client or AF via the LMF comprises sending a first event report message using user plane signaling to the LMF, with the first location information included in the first event report message.

Clause 6: The method of clause 5 wherein the first event report message comprises a supplementary services message, an HTTP message, or a SUPL ULP message.

Clause 7: The method of any one of clauses 5-6 wherein reporting the first location information for the UE to the external client or AF via the LMF further comprises exchanging Long Term Evolution (LTE) Positioning Protocol (LPP) messages with the LMF using user plane signaling either after or when reporting the first location information to provide positioning measurements to the LMF to enable the UE or the LMF to determine a location estimate for the UE, wherein the LMF sends a second event report message comprising the location estimate to the external client or AF using user plane signaling.

Clause 8a: The method of clause 2 wherein reporting the first location information for the UE to the external client or AF via the H-GMLC comprises sending a first event report message with the first location information using user plane signaling to the H-GMLC, wherein the H-GMLC sends a second event report message comprising the location estimate to the external client or AF using user plane signaling.

Clause 8b: The method of clause 8a, wherein the first event report message comprises a supplementary services message, an HTTP message, or a SUPL ULP message.

Clause 9: The method of any one of clauses 1-8b wherein the request for locating the UE includes at least one of: an indication of using user plane signaling to report the first location information, a type of user plane connection, or an address to which the first location information is to be reported.

Clause 10: The method of clause 9 wherein the UE establishes a first user plane connection to at least one of the external client or AF or to another entity based on the address, wherein the other entity establishes a second user plane connection towards the external client or AF, wherein the first location information is reported using (1) the first user plane connection or (2) the first user plane connection and second user plane connection.

Clause 11: The method of clause 10 wherein the first user plane connection and the second user plane connection are each based on at least one of an Internet Protocol (IP) or a Transmission Control Protocol (TCP), or both.

Clause 12: The method of clause 11 wherein the first user plane connection, the second user plane connection, or both, are secure and established based on received security information.

Clause 13: The method of any one of clauses 11-12 further comprising sending or receiving, using control plane signaling, a cancellation of locating the UE, wherein the first user plane connection is released after cancellation of a control plane connection.

Clause 14: The method of any one of clauses 1-13 wherein obtaining the first location information for the UE comprises: sending a request for assistance data to a location server using control plane signaling; and receiving assistance data from the location server using control plane signaling.

Clause 15: The method of any one of clauses 1-14 wherein sending the cumulative event report to the external client or AF may further comprise sending the cumulative event report to a location server, a Home Gateway Mobile Location Center (H-GMLC), or both.

Clause 16: A user equipment (UE) comprising: one or more transceivers; one or more memories; and one or more processors communicatively coupled with the one or more transceivers and the one or more memories, wherein the one or more processors are configured to: receive, via the one or more transceivers, a request for locating the UE, wherein the request for locating the UE: comprise a periodic or triggered location request based on a location request initiated by an external client or application function (AF), include one or more criteria for providing a cumulative event report, and is received by the UE using control plane signaling; responsive to detecting a periodic or triggered event, the periodic or triggered event occurring at a plurality of different times: obtain first location information for the UE, and report the first location information for the UE to the external client or AF using user plane signaling; and responsive to determining that at least one of the one or more criteria for providing the cumulative event report has been met, sending the cumulative event report, via the one or more transceivers, to the external client or AF using control plane signaling.

Clause 17: The UE of clause 16, wherein, to report the first location information for the UE to the external client or AF using user plane signaling, the one or more processors are configured to report the first location information for the UE (1) to the external client or AF directly, or (2) via a location management function (LMF) or Home Gateway Mobile Location Center (H-GMLC) or both.

Clause 18: The UE of clause 17 wherein, to report the first location information for the UE to the external client or AF directly, the one or more processors are configured to send an event report message to the external client or AF using user plane signaling, with the first location information included in the event report message.

Clause 19: The UE of any one of clauses 17-18 wherein, to report the first location information for the UE to the external client or AF via the LMF, the one or more processors are configured to send a first event report message using user plane signaling to the LMF, with the first location information included in the first event report message.

Clause 20: The UE of clause 19 wherein, to report the first location information for the UE to the external client or AF via the LMF, the one or more processors are further configured to exchange Long Term Evolution (LTE) Positioning Protocol (LPP) messages with the LMF using user plane signaling either after or when reporting the first location information to provide positioning measurements to the LMF to determine a location estimate for the UE using a UE assisted position method, wherein the LPP messages include a second event report message from the LMF comprising the location estimate to the external client or AF using user plane signaling.

Clause 21a: The UE of clause 17 wherein, to report the first location information for the UE to the external client or AF via the H-GMLC, the one or more processors are configured to send a first event report message with the first location information using user plane signaling to the H-GMLC.

Clause 21b: The UE of clause 21a, wherein, to the first event report message, the one or more processors are configured to send a supplementary services message, an HTTP message, or a SUPL ULP message.

Clause 22: The UE of any one of clauses 16-21b wherein, to receive the request for locating the UE, the one or more processors are configured to receive at least one of: an indication of using user plane signaling to report the first location information, a type of user plane connection, or an address to which the first location information is to be reported.

Clause 23: The UE of clause 22 wherein the one or more processers are configured to establish a first user plane connection to at least one of the external client or AF or to another entity based on the address, wherein the one or more processors are configured to report the first location information using (1) the first user plane connection or (2), for a second user plane connection established by the other entity, the first user plane connection a second user plane connection.

Clause 24: The UE of any one of clauses 16-23 wherein, to obtain the first location information for the UE, the one or more processors are configured to send a request for assistance data to a location server using control plane signaling; and receive assistance data from the location server using control plane signaling.

Clause 25: The UE of any one of clauses 16-24 wherein, to send the cumulative event report to the external client or AF may, the one or more processors are configured to send the cumulative event report to a location server, a Home Gateway Mobile Location Center (H-GMLC), or both.

Clause 26: An apparatus for locating a user equipment (UE) in a wireless network, the apparatus comprising: means for receiving a request for locating the UE, wherein the request for locating the UE: comprises a periodic or triggered location request based on a location request initiated by an external client or application function (AF), includes one or more criteria for providing a cumulative event report, and is received by the UE using control plane signaling; means for, responsive to detecting a periodic or triggered event, the periodic or triggered event occurring at a plurality of different times: obtaining first location information for the UE, and reporting the first location information for the UE to the external client or AF using user plane signaling; and means for, responsive to determining that at least one of the one or more criteria for providing the cumulative event report has been met, sending the cumulative event report to the external client or AF using control plane signaling.

Clause 27: The apparatus of clause 25, wherein the means for reporting the first location information for the UE to the external client or AF using user plane signaling comprises means for reporting the first location information for the UE (1) to the external client or AF directly, or (2) via a location management function (LMF) or Home Gateway Mobile Location Center (H-GMLC) or both.

Clause 28: The apparatus of clause 27 wherein the means for reporting the first location information for the UE to the external client or AF directly comprises means for sending an event report message to the external client or AF using user plane signaling, with the first location information included in the event report message.

Clause 29: The apparatus of any one of clauses 27-28 wherein the means for reporting the first location information for the UE to the external client or AF via the LMF comprises means for sending a first event report message using user plane signaling to the LMF, with the first location information included in the first event report message.

Clause 30: A non-transitory computer-readable medium storing instructions for locating a user equipment (UE) in a wireless network, the instructions comprising code for: receiving a request for locating the UE, wherein the request for locating the UE: comprising a periodic or triggered location request based on a location request initiated by an external client or application function (AF), including one or more criteria for providing a cumulative event report, and is received by the UE using control plane signaling; responsive to detecting a periodic or triggered event, the periodic or triggered event occurring at a plurality of different times: obtaining first location information for the UE, and reporting the first location information for the UE to the external client or AF using user plane signaling; and responsive to determining that at least one of the one or more criteria for providing the cumulative event report has been met, sending the cumulative event report to the external client or AF using control plane signaling.

An apparatus having means for performing the method of any one of clauses 1-15.

A non-transitory computer-readable medium storing instructions, the instructions comprising code for performing the method of any one of clauses 1-15.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method performed by a user equipment (UE) for locating the UE in a wireless network, the method comprising:
   receiving a request for locating the UE, wherein the request for locating the UE:
   comprises a periodic or triggered location request based on a location request initiated by an external client or application function (AF),
   includes one or more criteria for providing a cumulative event report, and
   is received by the UE using control plane signaling;
   responsive to detecting a periodic or triggered event, the periodic or triggered event occurring at a plurality of different times:
   obtaining first location information for the UE, and
   reporting the first location information for the UE to the external client or AF using user plane signaling; and
   responsive to determining that at least one of the one or more criteria for providing the cumulative event report has been met, sending the cumulative event report to the external client or AF using control plane signaling.

2. The method of claim 1, wherein reporting the first location information for the UE to the external client or AF using user plane signaling comprises reporting the first location information for the UE (1) to the external client or AF directly, or (2) via a location management function (LMF) or Home Gateway Mobile Location Center (H-GMLC) or both.

3. The method of claim 2, wherein reporting the first location information for the UE to the external client or AF directly comprises sending an event report message to the external client or AF using user plane signaling, with the first location information included in the event report message.

4. The method of claim 3, wherein the event report message comprises a supplementary services message, an HTTP message, or a SUPL ULP message.

5. The method of claim 2, wherein reporting the first location information for the UE to the external client or AF via the LMF comprises sending a first event report message using user plane signaling to the LMF, with the first location information included in the first event report message.

6. The method of claim 5, wherein the first event report message comprises a supplementary services message, an HTTP message, or a SUPL ULP message.

7. The method of claim 5, wherein reporting the first location information for the UE to the external client or AF via the LMF further comprises exchanging Long Term Evolution (LTE) Positioning Protocol (LPP) messages with the LMF using user plane signaling either after or when reporting the first location information to provide positioning measurements to the LMF to enable the UE or the LMF to determine a location estimate for the UE, wherein the LMF sends a second event report message comprising the location estimate to the external client or AF using user plane signaling.

8. The method of claim 2, wherein reporting the first location information for the UE to the external client or AF via the H-GMLC comprises sending a first event report message with the first location information using user plane signaling to the H-GMLC, wherein the H-GMLC sends a second event report message comprising the location estimate to the external client or AF using user plane signaling.

9. The method of claim 1, wherein the request for locating the UE includes at least one of:
   an indication of using user plane signaling to report the first location information, a
   type of user plane connection, or
   an address to which the first location information is to be reported.

10. The method of claim 9, wherein the UE establishes a first user plane connection to at least one of the external client or AF or to another entity based on the address, wherein the other entity establishes a second user plane connection towards the external client or AF, wherein the first location information is reported using (1) the first user plane connection or (2) the first user plane connection and second user plane connection.

11. The method of claim 10, wherein the first user plane connection and the second user plane connection are each based on at least one of an Internet Protocol (IP) or a Transmission Control Protocol (TCP), or both.

12. The method of claim 11, wherein the first user plane connection, the second user plane connection, or both, are secure and established based on received security information.

13. The method of claim 11, further comprising:
sending or receiving, using control plane signaling, a cancellation of locating the UE, wherein the first user plane connection is released after cancellation of a control plane connection.

14. The method of claim 1, wherein obtaining the first location information for the UE comprises:
sending a request for assistance data to a location server using control plane signaling; and
receiving assistance data from the location server using control plane signaling.

15. The method of claim 1, wherein sending the cumulative event report to the external client or AF may further comprise sending the cumulative event report to a location server, a Home Gateway Mobile Location Center (H-GMLC), or both.

16. A user equipment (UE) comprising:
one or more transceivers;
one or more memories; and
one or more processors communicatively coupled with the one or more transceivers and the one or more memories, wherein the one or more processors are configured to:
receive, via the one or more transceivers, a request for locating the UE, wherein the request for locating the UE:
comprise a periodic or triggered location request based on a location request initiated by an external client or application function (AF),
include one or more criteria for providing a cumulative event report, and
is received by the UE using control plane signaling;
responsive to detecting a periodic or triggered event, the periodic or triggered event occurring at a plurality of different times:
obtain first location information for the UE, and
report the first location information for the UE to the external client or AF using user plane signaling; and
responsive to determining that at least one of the one or more criteria for providing the cumulative event report has been met, sending the cumulative event report, via the one or more transceivers, to the external client or AF using control plane signaling.

17. The UE of claim 16, wherein, to report the first location information for the UE to the external client or AF using user plane signaling, the one or more processors are configured to report the first location information for the UE (1) to the external client or AF directly, or (2) via a location management function (LMF) or Home Gateway Mobile Location Center (H-GMLC) or both.

18. The UE of claim 17, wherein, to report the first location information for the UE to the external client or AF directly, the one or more processors are configured to send an event report message to the external client or AF using user plane signaling, with the first location information included in the event report message.

19. The UE of claim 17, wherein, to report the first location information for the UE to the external client or AF via the LMF, the one or more processors are configured to send a first event report message using user plane signaling to the LMF, with the first location information included in the first event report message.

20. The UE of claim 19, wherein, to report the first location information for the UE to the external client or AF via the LMF, the one or more processors are further configured to exchange Long Term Evolution (LTE) Positioning Protocol (LPP) messages with the LMF using user plane signaling either after or when reporting the first location information to provide positioning measurements to the LMF to determine a location estimate for the UE using a UE assisted position method, wherein the LPP messages include a second event report message from the LMF comprising the location estimate to the external client or AF using user plane signaling.

21. The UE of claim 17, wherein, to report the first location information for the UE to the external client or AF via the H-GMLC, the one or more processors are configured to send a first event report message with the first location information using user plane signaling to the H-GMLC.

22. The UE of claim 16, wherein, to receive the request for locating the UE, the one or more processors are configured to receive at least one of:
an indication of using user plane signaling to report the first location information, a
type of user plane connection, or
an address to which the first location information is to be reported.

23. The UE of claim 22, wherein the one or more processors are configured to establish a first user plane connection to at least one of the external client or AF or to another entity based on the address, wherein the one or more processors are configured to report the first location information using (1) the first user plane connection or (2), for a second user plane connection established by the other entity, the first user plane connection a second user plane connection.

24. The UE of claim 16, wherein, to obtain the first location information for the UE, the one or more processors are configured to:
send a request for assistance data to a location server using control plane signaling; and
receive assistance data from the location server using control plane signaling.

25. The UE of claim 16, wherein, to send the cumulative event report to the external client or AF may, the one or more processors are configured to send the cumulative event report to a location server, a Home Gateway Mobile Location Center (H-GMLC), or both.

26. An apparatus for locating a user equipment (UE) in a wireless network, the apparatus comprising:
means for receiving a request for locating the UE, wherein the request for locating the UE:
comprises a periodic or triggered location request based on a location request initiated by an external client or application function (AF),
includes one or more criteria for providing a cumulative event report, and
is received by the UE using control plane signaling;
means for, responsive to detecting a periodic or triggered event, the periodic or triggered event occurring at a plurality of different times:
obtaining first location information for the UE, and
reporting the first location information for the UE to the external client or AF using user plane signaling; and means for, responsive to determining that at least one of the one or more criteria for providing the cumulative event report has been met, sending the cumulative event report to the external client or AF using control plane signaling.

27. The apparatus of claim 26, wherein the means for reporting the first location information for the UE to the external client or AF using user plane signaling comprises means for reporting the first location information for the UE (1) to the external client or AF directly, or (2) via a location management function (LMF) or Home Gateway Mobile Location Center (H-GMLC) or both.

28. The apparatus of claim 27, wherein the means for reporting the first location information for the UE to the external client or AF directly comprises means for sending an event report message to the external client or AF using user plane signaling, with the first location information included in the event report message.

29. The apparatus of claim 27, wherein the means for reporting the first location information for the UE to the external client or AF via the LMF comprises means for sending a first event report message using user plane signaling to the LMF, with the first location information included in the first event report message.

30. A non-transitory computer-readable medium storing instructions for locating a user equipment (UE) in a wireless network, the instructions comprising code for:
receiving a request for locating the UE, wherein the request for locating the UE:
comprising a periodic or triggered location request based on a location request initiated by an external client or application function (AF),
including one or more criteria for providing a cumulative event report, and
is received by the UE using control plane signaling;
responsive to detecting a periodic or triggered event, the periodic or triggered event occurring at a plurality of different times:
obtaining first location information for the UE, and
reporting the first location information for the UE to the external client or AF using user plane signaling; and
responsive to determining that at least one of the one or more criteria for providing the cumulative event report has been met, sending the cumulative event report to the external client or AF using control plane signaling.

* * * * *